(12) United States Patent
Kawamura

(10) Patent No.: US 10,241,306 B2
(45) Date of Patent: Mar. 26, 2019

(54) TELEPHOTO LENS AND IMAGE PICKUP APPARATUS USING THE SAME

(71) Applicant: OLYMPUS CORPORATION, Hachioji-shi, Tokyo (JP)

(72) Inventor: Kazuteru Kawamura, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/372,328

(22) Filed: Dec. 7, 2016

(65) Prior Publication Data

US 2017/0199358 A1   Jul. 13, 2017

(30) Foreign Application Priority Data

Jan. 13, 2016  (JP) .................. 2016-004631

(51) Int. Cl.
| | |
|---|---|
| *G02B 13/02* | (2006.01) |
| *G02B 27/64* | (2006.01) |
| *G03B 5/00* | (2006.01) |
| *G03B 13/32* | (2006.01) |

(52) U.S. Cl.
CPC .......... *G02B 13/02* (2013.01); *G02B 27/646* (2013.01); *G03B 5/00* (2013.01); *G03B 13/32* (2013.01); *G03B 2205/0007* (2013.01)

(58) Field of Classification Search
CPC ... G02B 9/00; G02B 9/12; G02B 9/14; G02B 13/00; G02B 13/0015; G02B 13/0035; G02B 15/00; G02B 15/14; G02B 15/173; G02B 15/22; G02B 15/24; G02B 15/28
See application file for complete search history.

(56) References Cited

U.S. PATENT DOCUMENTS

| | | | | |
|---|---|---|---|---|
| 5,442,486 A | * | 8/1995 | Sato ..................... | G02B 15/173 359/557 |
| 6,115,188 A | * | 9/2000 | Nishio ................. | G02B 15/173 359/557 |
| 6,512,633 B2 | | 1/2003 | Konno et al. | |
| 7,626,771 B2 | | 12/2009 | Yokoyama | |
| 7,715,116 B2 | | 5/2010 | Kato | |
| 2006/0238891 A1 | * | 10/2006 | Ogata .................. | G02B 15/173 359/690 |

(Continued)

FOREIGN PATENT DOCUMENTS

| | | |
|---|---|---|
| JP | 09236742 A | 9/1997 |
| JP | 2008261969 A | 10/2008 |

(Continued)

*Primary Examiner* — Thong Nguyen
(74) *Attorney, Agent, or Firm* — Holtz, Holtz & Volek PC

(57) ABSTRACT

A telephoto lens includes a first lens unit having a positive refractive power, a second lens unit having a negative refractive power, and a third lens unit, and the first lens unit includes a front-side lens unit having a positive refractive power and a rear-side lens unit, and the second lens unit moves at the time of focusing, and the third lens unit has a positive lens and a negative lens, and the front-side lens unit includes lenses positioned closer to the object side than a predetermined negative lens that satisfies Conditional Expression (a), and the rear-side lens unit has the predetermined negative lens and a positive lens, and Conditional Expressions (1A) and (14) are satisfied:

$$0.5 \le |f/fLn| \tag{a},$$

$$0.015 \le DGFGR/f \le 0.25 \tag{1A, and}$$

$$0.19 \le DGF\text{airmax}/DGF \le 1.0 \tag{14}.$$

41 Claims, 22 Drawing Sheets

(56) References Cited

U.S. PATENT DOCUMENTS

2009/0273845 A1* 11/2009 Maetaki ................. G02B 1/00
359/676
2017/0031141 A1* 2/2017 Tomioka .............. G02B 15/173

FOREIGN PATENT DOCUMENTS

JP          2009139543 A     6/2009
JP          2013250293 A     12/2013

* cited by examiner

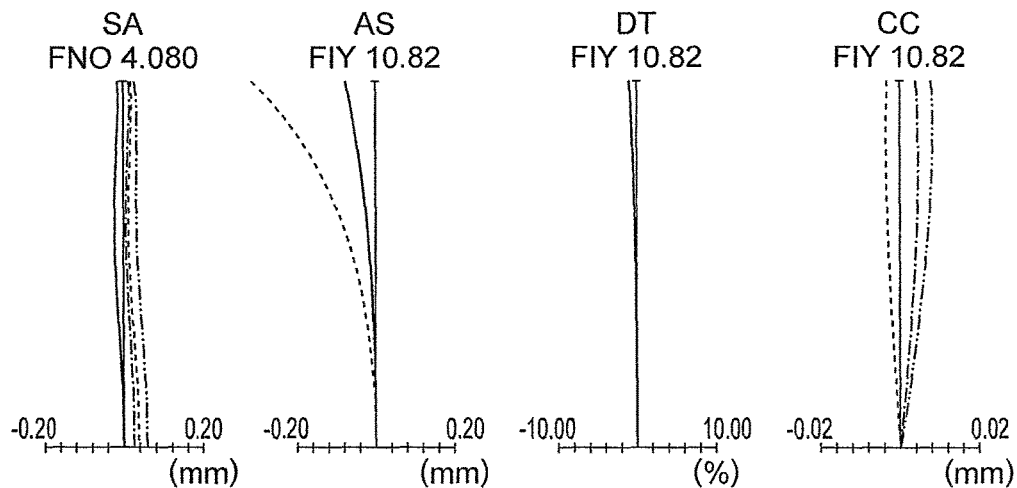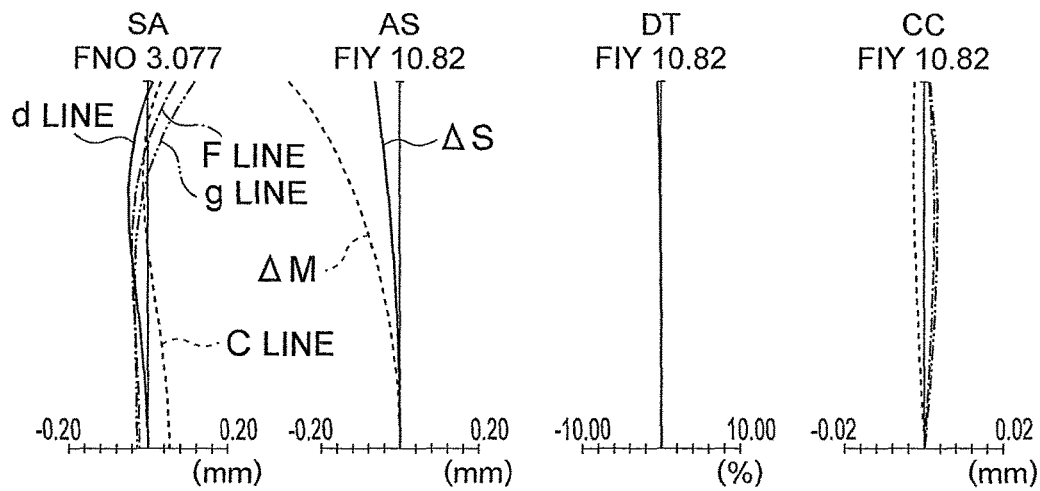

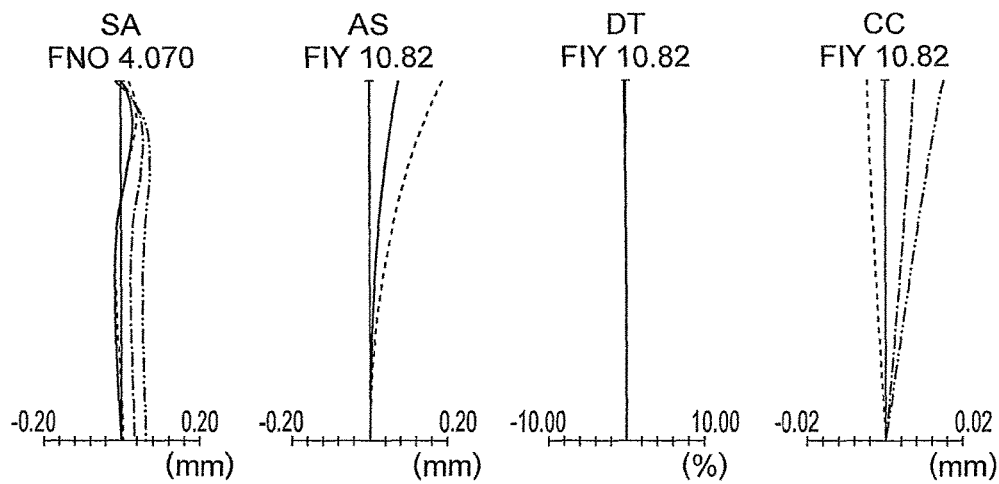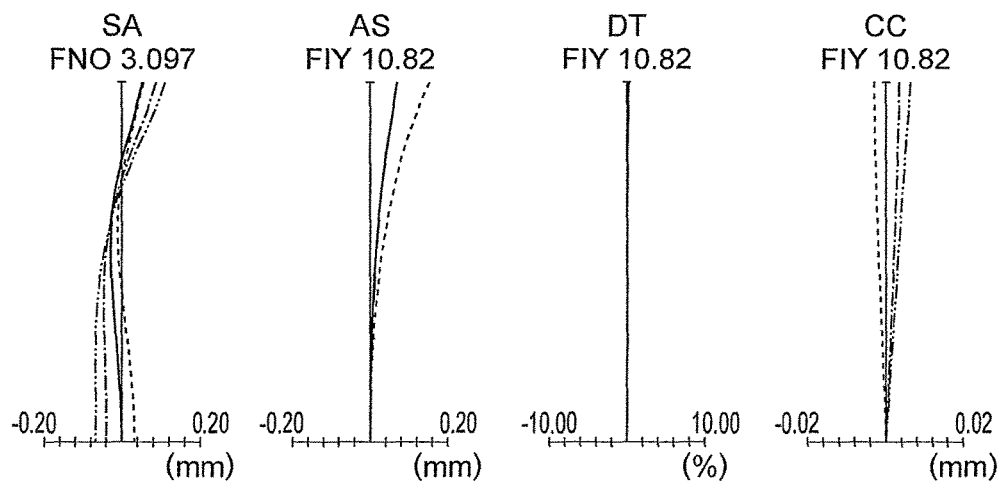

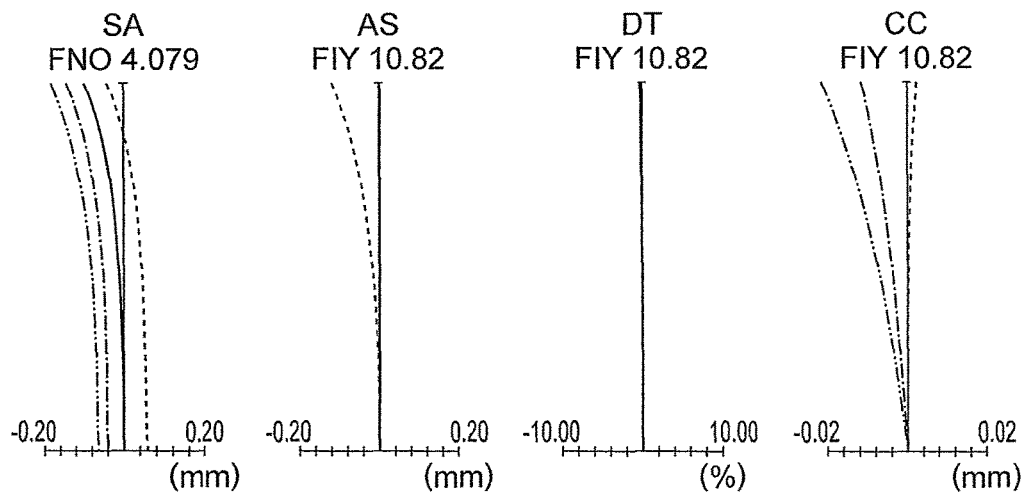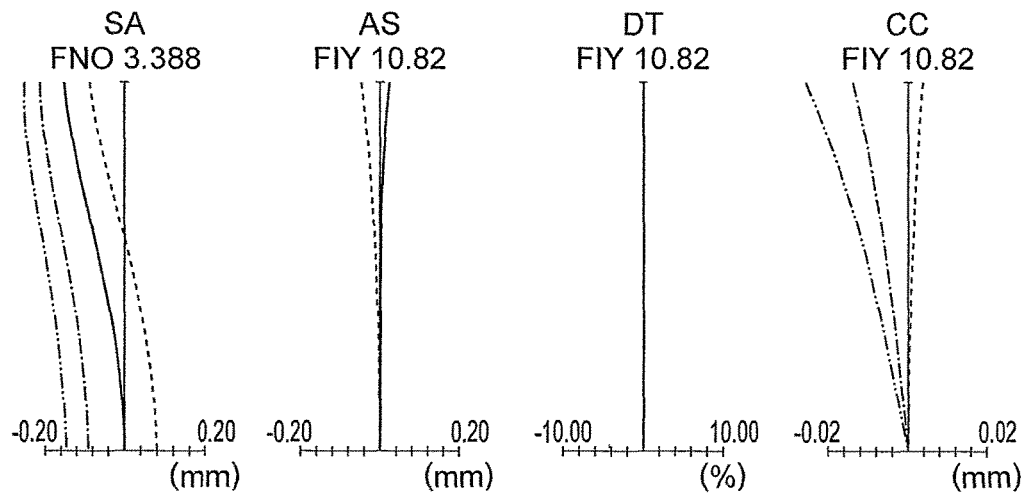

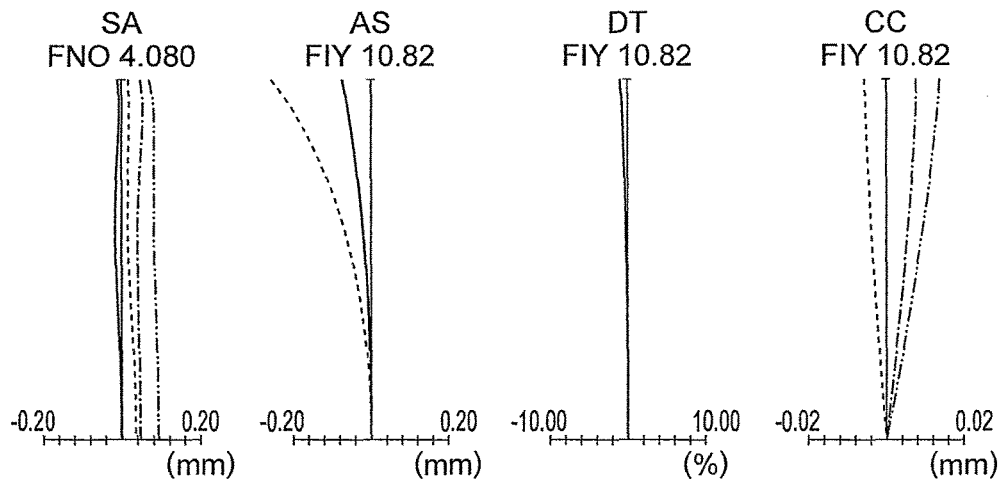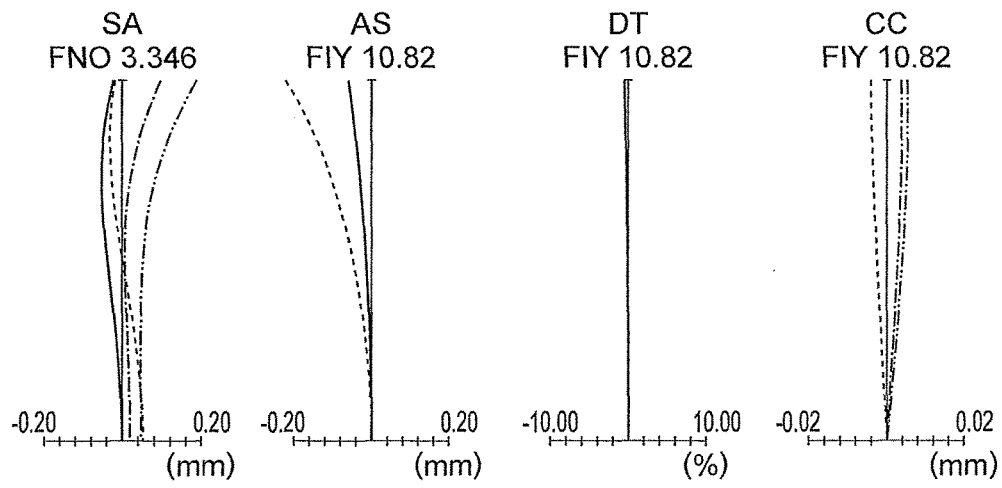

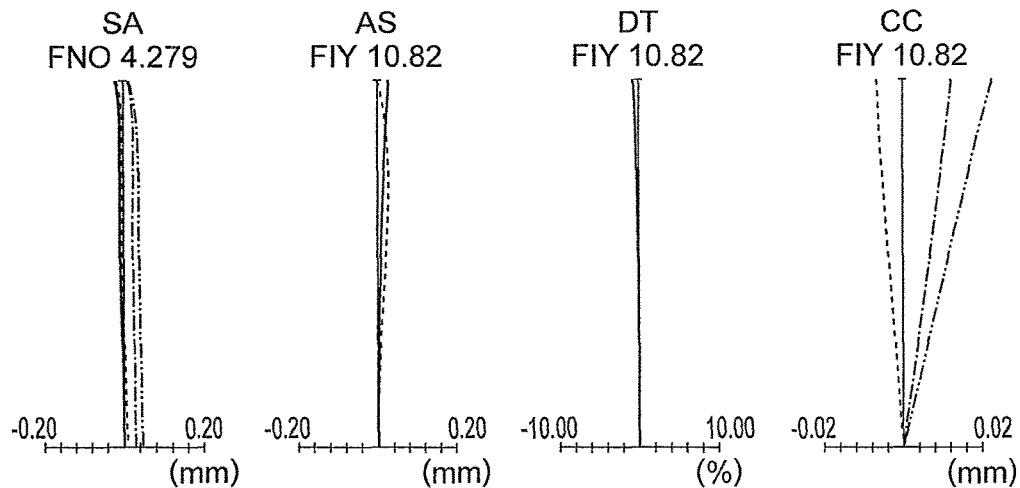
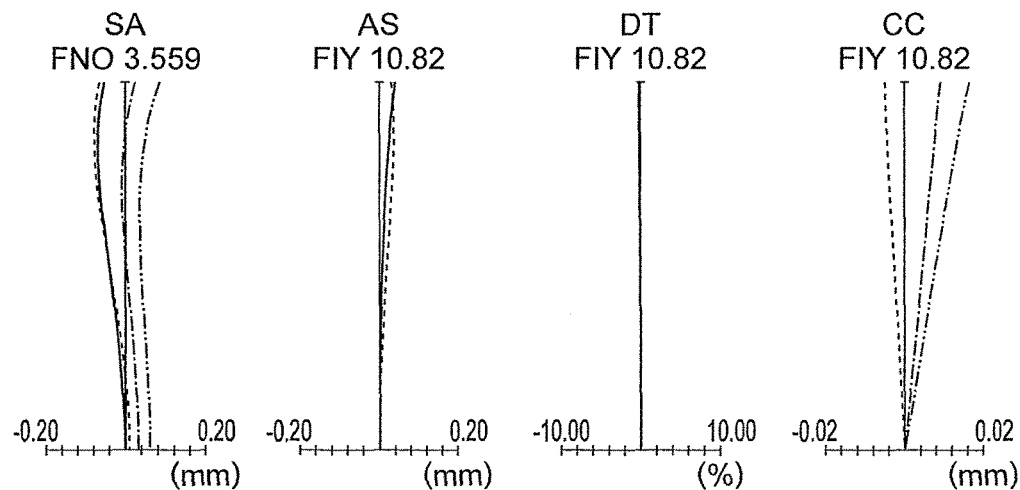

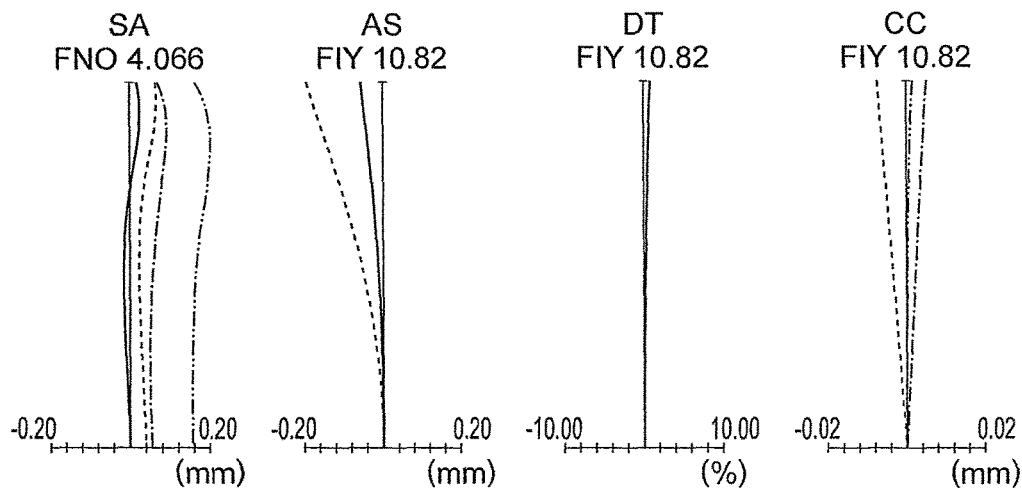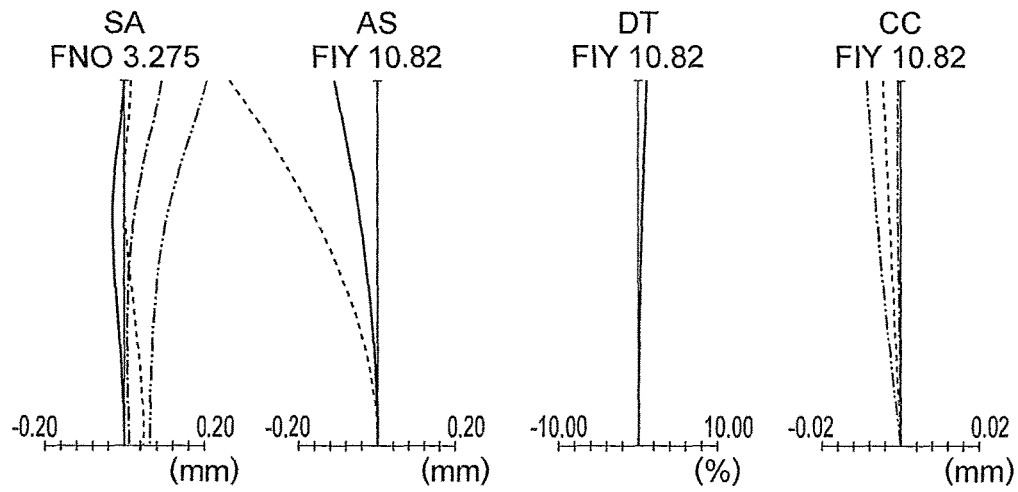

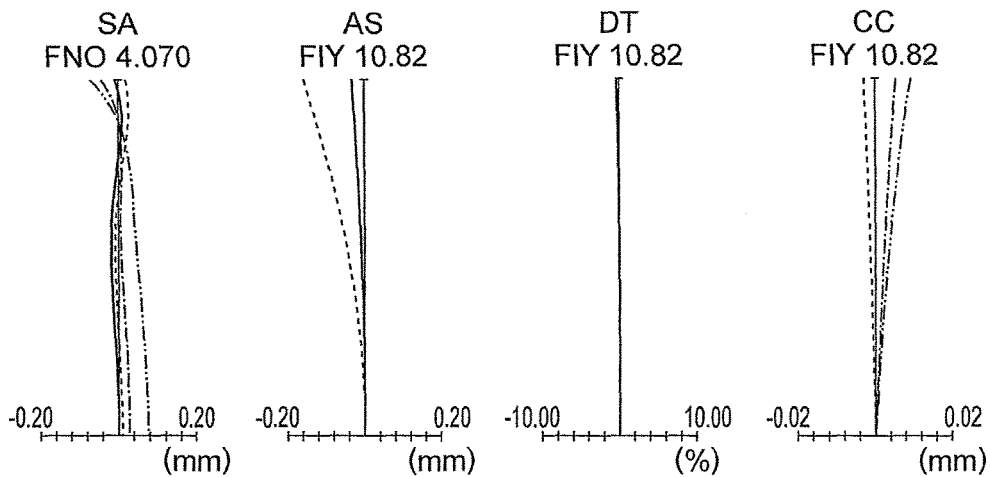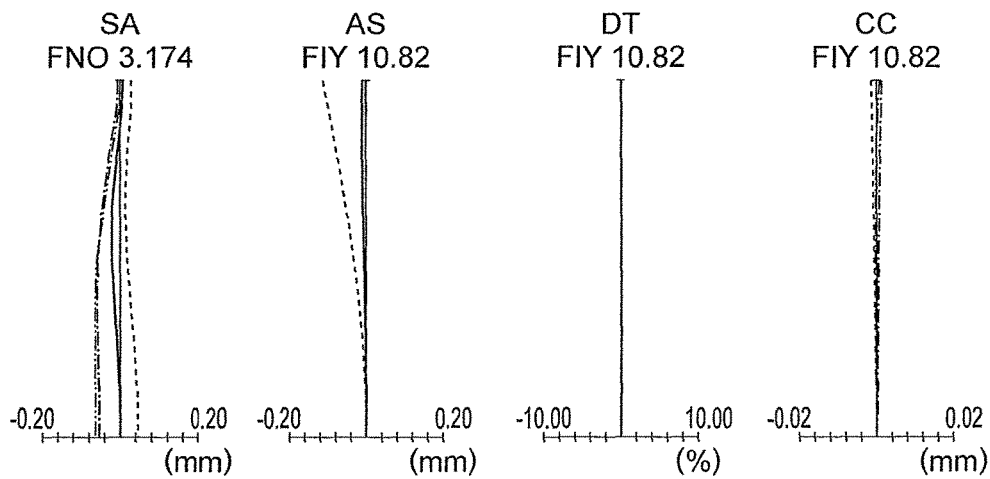

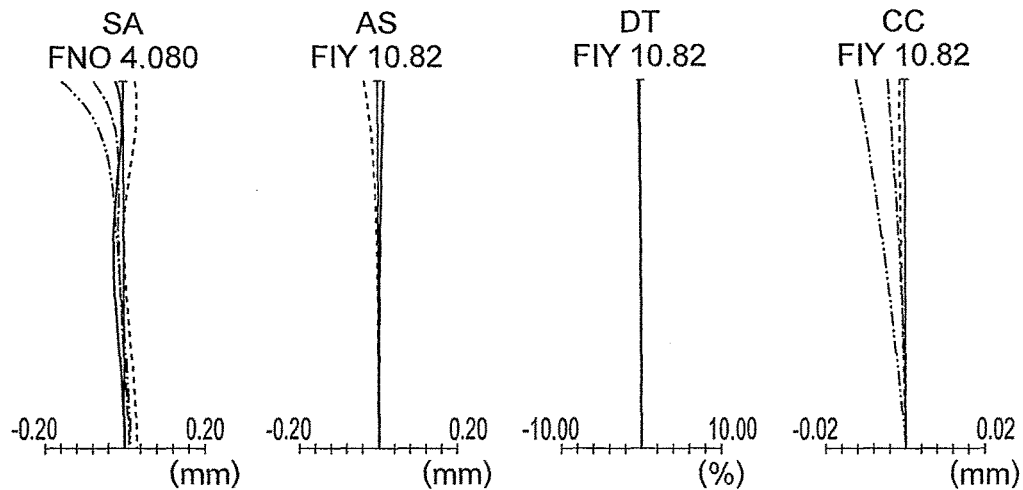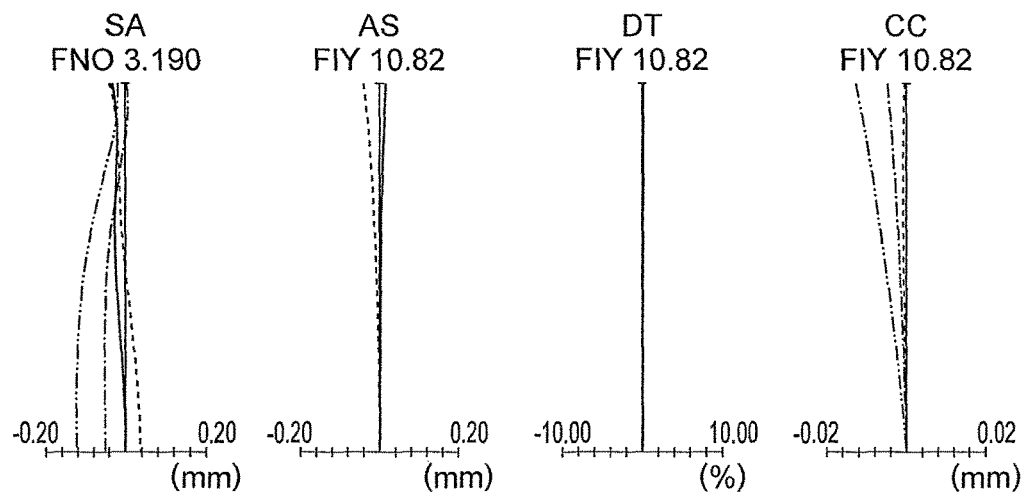

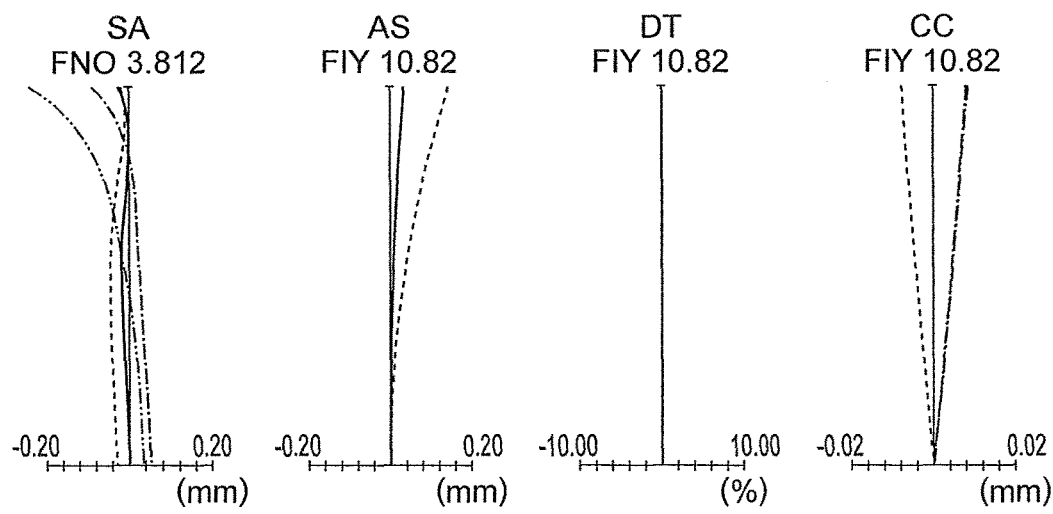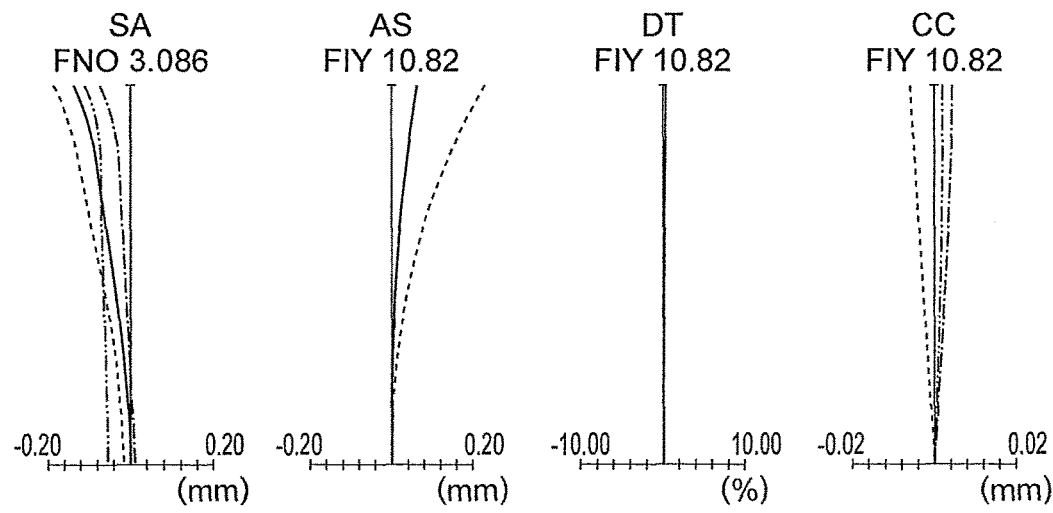

TELEPHOTO LENS AND IMAGE PICKUP APPARATUS USING THE SAME

CROSS-REFERENCE TO RELATED APPLICATION

The present application is based upon and claims the benefit of priority from the prior Japanese Patent Application No. 2016-004631 filed on Jan. 13, 2016; the entire contents of which are incorporated herein by reference.

BACKGROUND OF THE INVENTION

Field of the Invention

The present invention relates to a telephoto lens and an image pickup apparatus using the same.

Description of the Related Art

Photography using a telephoto lens or a super-telephoto lens (hereinafter referred to as "telephoto lens") has the effect of making a distant subject or a small subject appear in front of the photographer. For this reason, telephoto lenses are widely used in various scenes such as taking photographs of sports scenes, taking photographs of wild animals such as wild birds, and astrophotography.

Examples of telephoto lenses for use in taking photographs of such scenes are disclosed in Japanese Patent Application Laid-open Nos. 2009-139543, 2008-261969, 2013-250293, and H09-236742.

SUMMARY OF THE INVENTION

A telephoto lens of the present invention comprises lens units consisting of:

in order from an object side,
a first lens unit having a positive refractive power;
a second lens unit having a negative refractive power; and
a third lens unit,
wherein the first lens unit consists of, in order from the object side, a front-side lens unit having a positive refractive power and a rear-side lens unit,
at a time of focusing, second lens unit moves,
the third lens unit has a positive lens and a negative lens,
the front-side lens unit comprises lens elements positioned closer to the object side than a predetermined negative lens element that satisfies following Conditional Expression (a),
the lens elements positioned closer to the object side than the predetermined negative lens element include a plurality of positive lens elements,
the rear-side lens unit has the predetermined negative lens element and a positive lens element, and
following Conditional Expressions (1A) and (14) are satisfied, $$0.5 \leq |f/fLn| \quad (a),$$

$$0.015 \leq DGFGR/f \leq 0.25 \quad (1A), \text{ and}$$

$$0.19 \leq DGF\text{airmax}/DGF \leq 1.0 \quad (14),$$

where,
f is a focal length of the entire telephoto lens;
fLn is a focal length of the predetermined negative lens element;
DGFGR is an axial air space between the front-side lens unit and the rear-side lens unit;
DGFairmax is a largest axial air space, of axial air spaces in the front-side lens unit; and
DGF is an axial thickness of the front-side lens unit.

Another telephoto lens of the present invention comprises lens units consisting of:

in order from an object side,
a first lens unit having a positive refractive power;
a second lens unit having a negative refractive power; and
a third lens unit,
wherein
the first lens unit consists of, in order from the object side, a front-side lens unit having a positive refractive power, a first rear-side lens unit, and a second rear-side lens unit, and includes no other lens units,
at a time of focusing, the second lens unit moves,
the third lens unit has a positive lens element and a negative lens element,
the front-side lens unit comprises lens elements positioned closer to the object side than a predetermined negative lens element that satisfies following Conditional Expression (a),
the lens elements positioned closer to the object side than the predetermined negative lens element include a plurality of positive lens elements,
the first rear-side lens unit has the predetermined negative lens element and a positive lens element,
the second rear-side lens unit has a positive lens element, and
following Conditional Expressions (2B) and (16) are satisfied:

$$0.5 \leq |f/fLn| \quad (a),$$

$$0.10 \leq \Delta GFGR1/f \leq 0.5 \quad (2B), \text{ and}$$

$$50 \leq vdLp1 \quad (16),$$

where,
f is a focal length of the entire telephoto lens;
fLn is a focal length of the predetermined negative lens element;
$\Delta GFGR1$ is an axial air space from an object-side surface in the front-side lens unit to an object-side surface in the first rear-side lens unit; and
vdLp1 is an Abbe number of a positive lens positioned closest to the object.

Another telephoto lens of the present invention comprises lens units consisting of:

in order from an object side,
a first lens unit having a positive refractive power;
a second lens unit having a negative refractive power; and
a third lens unit,
wherein
the first lens unit consists of, in order from the object side, a front-side lens unit having a positive refractive power, a first rear-side lens unit, and a second rear-side lens unit,
at a time of focusing, the second lens unit moves,
the third lens unit has a positive lens element and a negative lens element,
the front-side lens unit comprises a lens element positioned closer to the object side than a predetermined negative lens element that satisfies following Conditional Expression (a),
the lens element positioned closer to the object side than the predetermined negative lens element includes a positive lens element,
the first rear-side lens unit has the predetermined negative lens element and a positive lens element,
the second rear-side lens unit has a positive lens element, and following Conditional Expressions (2B) and (3) are satisfied:

$$0.5 \le |f/fLn| \quad (a),$$

$$0.10 \le \Delta GFGR1/f \le 0.5 \quad (2B), \text{ and}$$

$$72 \le vdGFave \quad (3),$$

where, f is a focal length of the entire telephoto lens;

fLn is a focal length of the predetermined negative lens element;

ΔGFGR1 is an axial air space from an object-side surface in the front-side lens unit to an object-side surface in the first rear-side lens unit; and vdGFave is an average Abbe number of the positive lens element in the front-side lens unit.

Furthermore, an image pickup apparatus of the present invention comprises:

an optical system; and an image pickup element having an image plane and converting an image formed on the image plane by the optical system to an electrical signal, wherein the optical system is any one of the telephoto lenses described above.

BRIEF DESCRIPTION OF THE DRAWINGS

FIG. 10A, FIG. 10B, FIG. 10C, FIG. 10D, FIG. 10E, FIG. 10F, FIG. 10G, and FIG. 10H are aberration diagrams of the telephoto lens of Example 1;

FIG. 11A, FIG. 11B, FIG. 11C, FIG. 11D, FIG. 11E, FIG. 11F, FIG. 11G, and FIG. 11H are aberration diagrams of the telephoto lens of Example 2;

FIG. 12A, FIG. 12B, FIG. 12C, FIG. 12D, FIG. 12E, FIG. 12F, FIG. 12G, and FIG. 12H are aberration diagrams of the telephoto lens of Example 3;

FIG. 13A, FIG. 13B, FIG. 13C, FIG. 13D, FIG. 13E, FIG. 13F, FIG. 13G, and FIG. 13H are aberration diagrams of the telephoto lens of Example 4;

FIG. 14A, FIG. 14B, FIG. 14C, FIG. 14D, FIG. 14E, FIG. 14F, FIG. 14G, and FIG. 14H are aberration diagrams of the telephoto lens of Example 5;

FIG. 15A, FIG. 15B, FIG. 15C, FIG. 15D, FIG. 15E, FIG. 15F, FIG. 15G, and FIG. 15H are aberration diagrams of the telephoto lens of Example 6;

FIG. 16A, FIG. 16B, FIG. 16C, FIG. 16D, FIG. 16E, FIG. 16F, FIG. 16G, and FIG. 16H are is an aberration diagram of the telephoto lens of Example 7;

FIG. 17A, FIG. 17B, FIG. 17C, FIG. 17D, FIG. 17E, FIG. 17F, FIG. 17G, and FIG. 17H are aberration diagrams of the telephoto lens of Example 8;

FIG. 18A, FIG. 18B, FIG. 18C, FIG. 18D, FIG. 18E, FIG. 18F, FIG. 18G, and FIG. 18H are aberration diagrams of the telephoto lens of Example 9;

DETAILED DESCRIPTION OF THE PREFERRED EMBODIMENTS

Figure 1A:
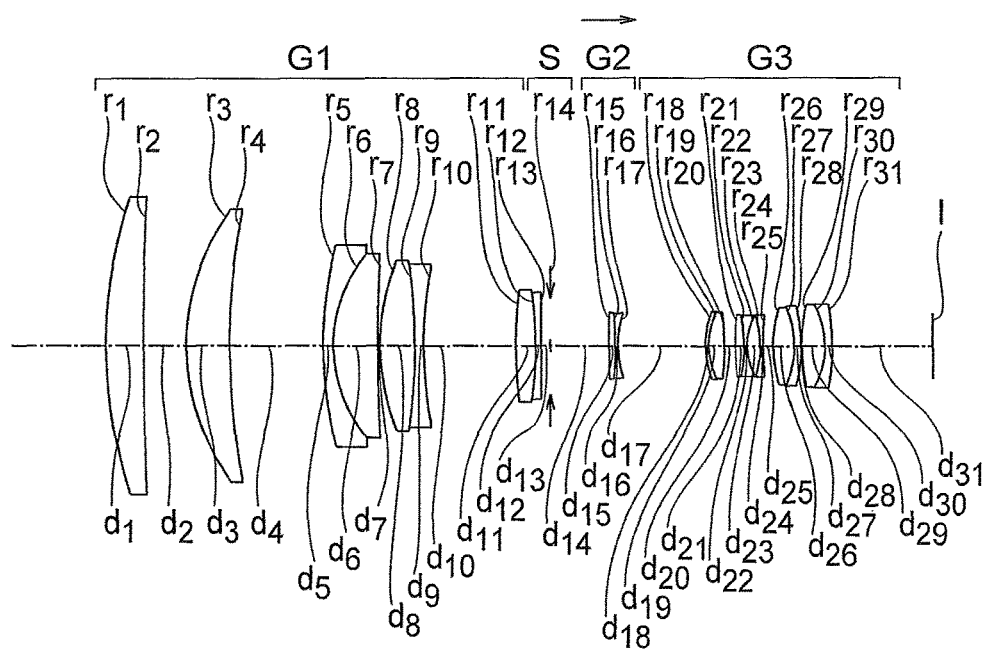
FIG. 1A and FIG. 1B are lens cross-sectional views of a telephoto lens of Example 1.
Figure 1B:
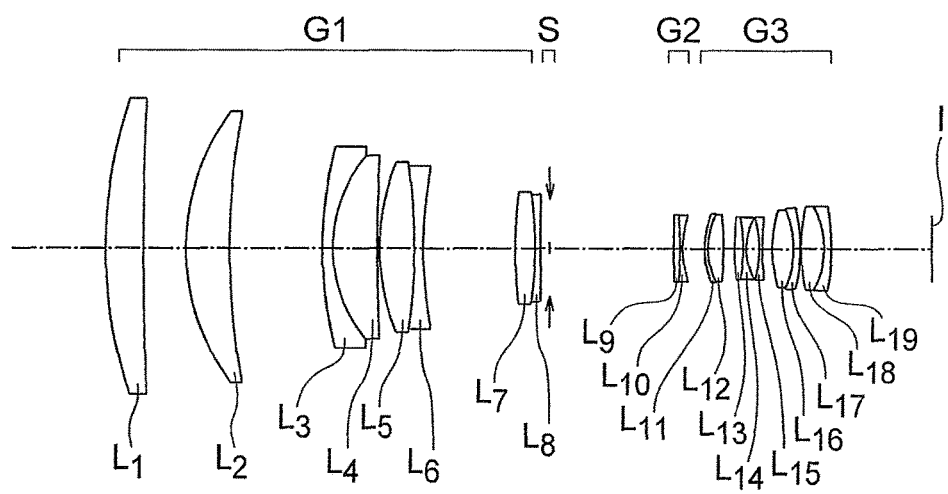
Figure 2A:
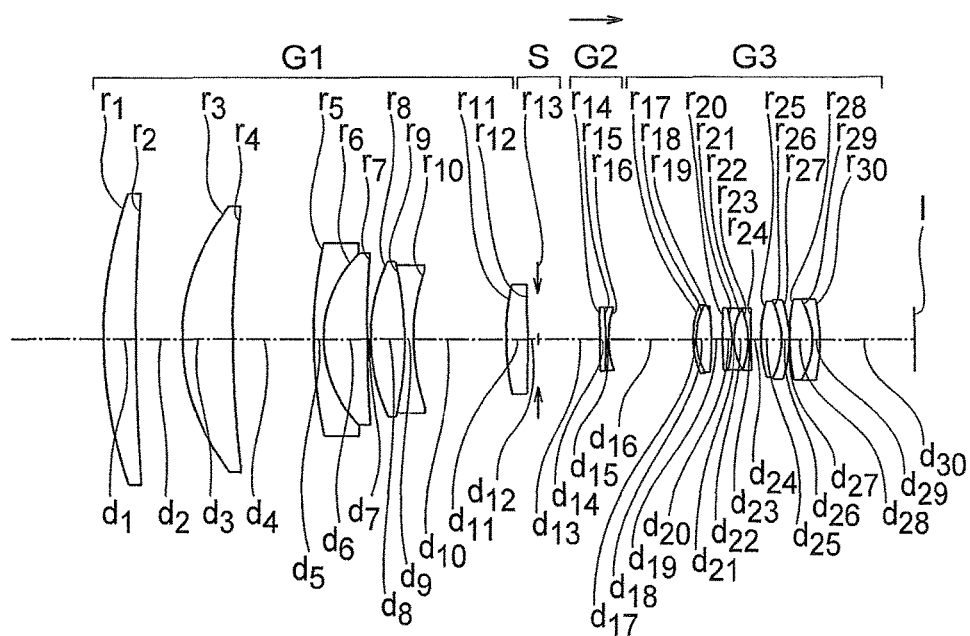
FIG. 2A and FIG. 2B are lens cross-sectional views of a telephoto lens of Example 2.
Figure 2B:
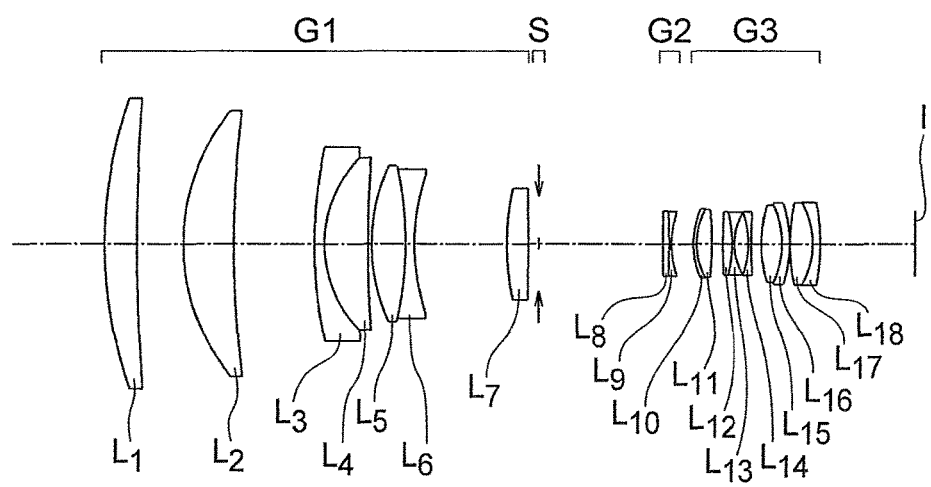
Figure 3A:
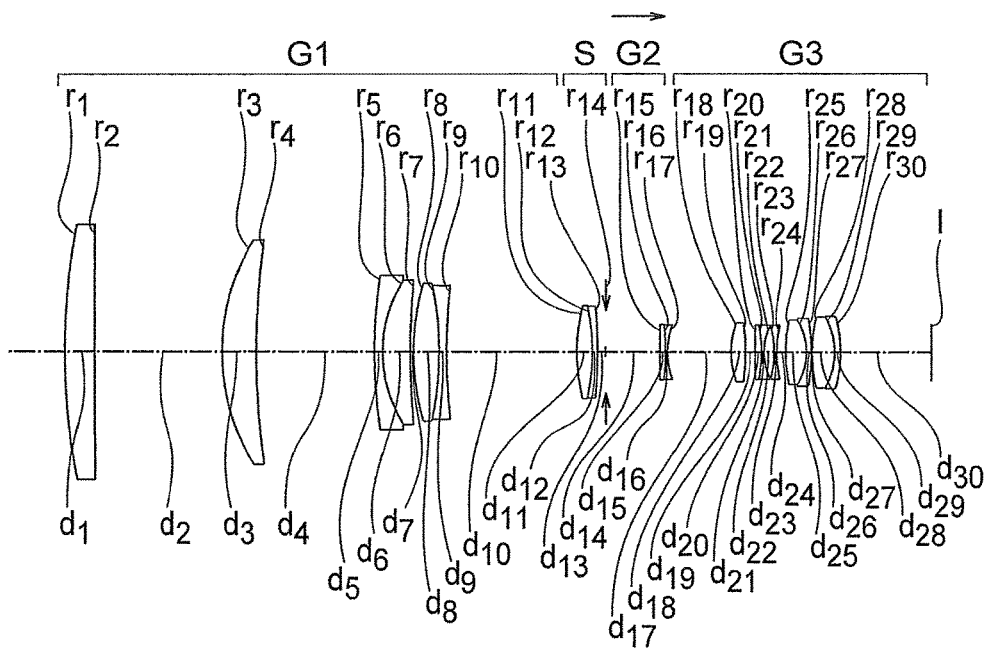
FIG. 3A and FIG. 3B are lens cross-sectional views of a telephoto lens of Example 3.
Figure 3B:
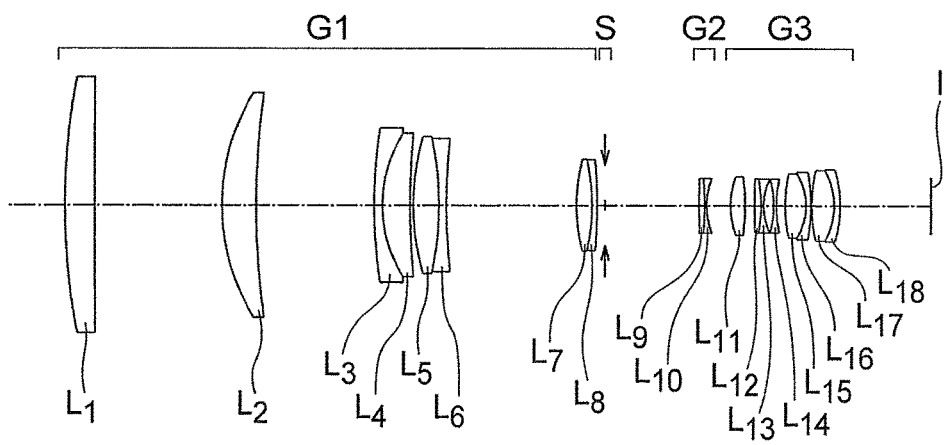
Figure 4A:
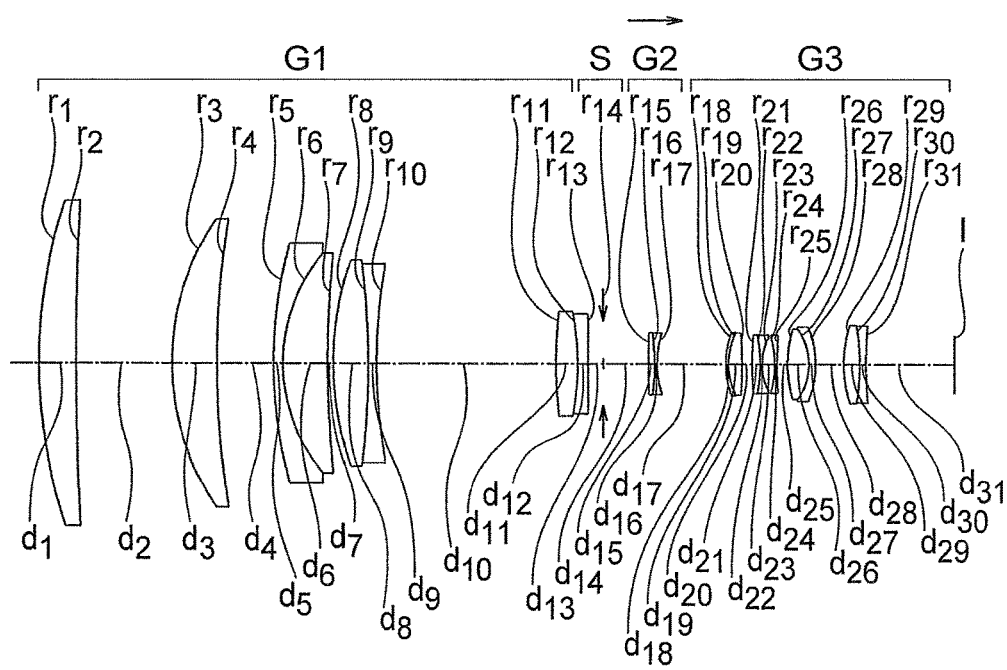
FIG. 4A and FIG. 4B are lens cross-sectional views of a telephoto lens of Example 4.
Figure 4B:
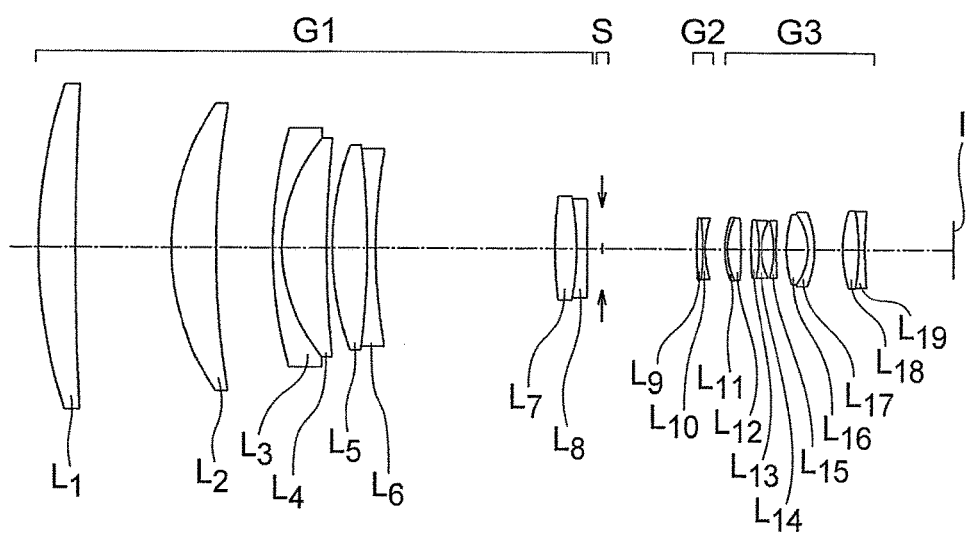
Figure 5A:
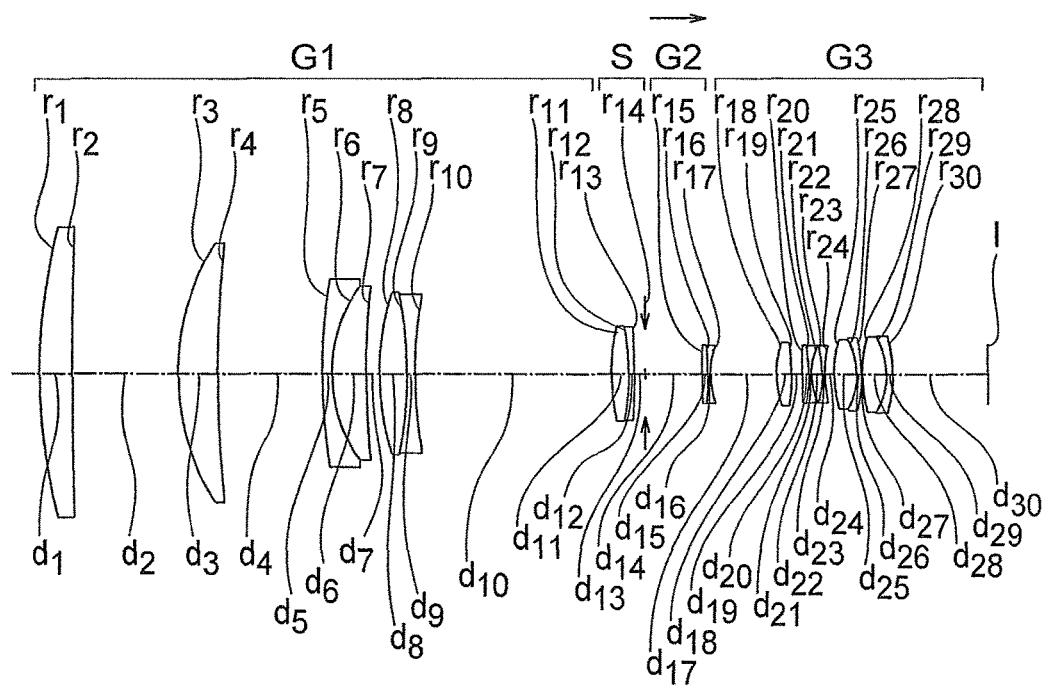
FIG. 5A and FIG. 5B are lens cross-sectional views of a telephoto lens of Example 5.
Figure 5B:
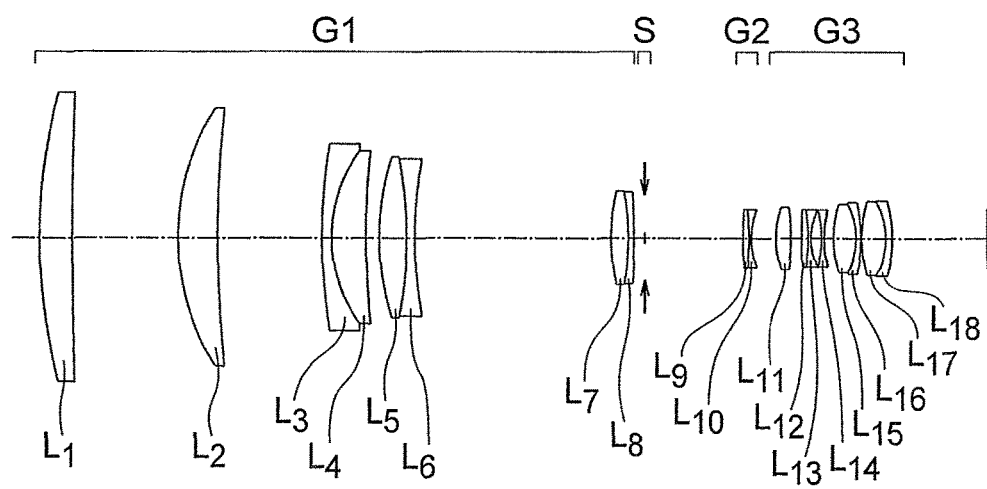
Figure 6A:
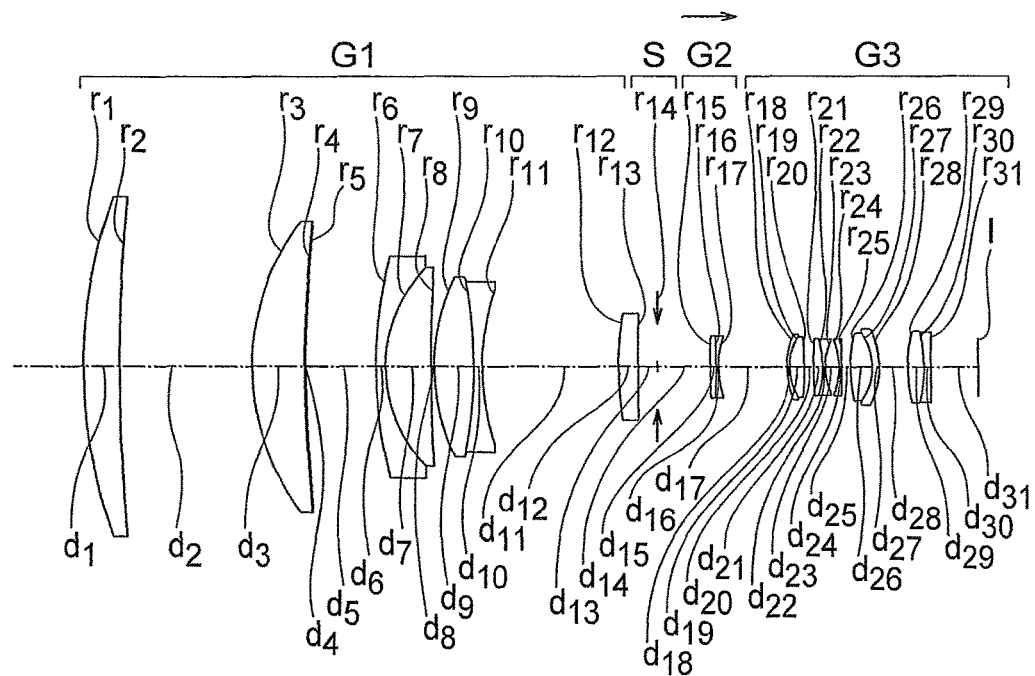
FIG. 6A and FIG. 6B are lens cross-sectional views of a telephoto lens of Example 6.
Figure 6B:
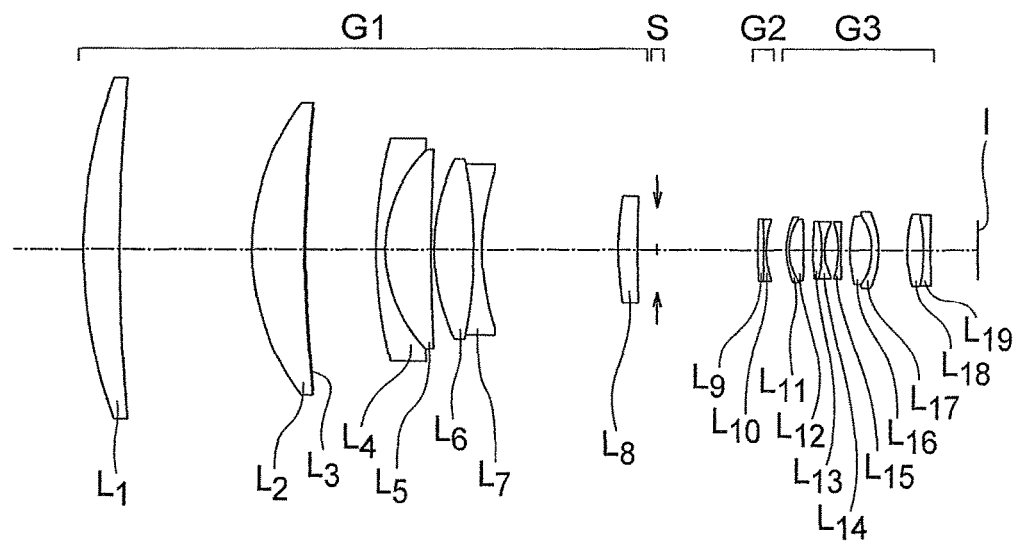
Figure 7A:
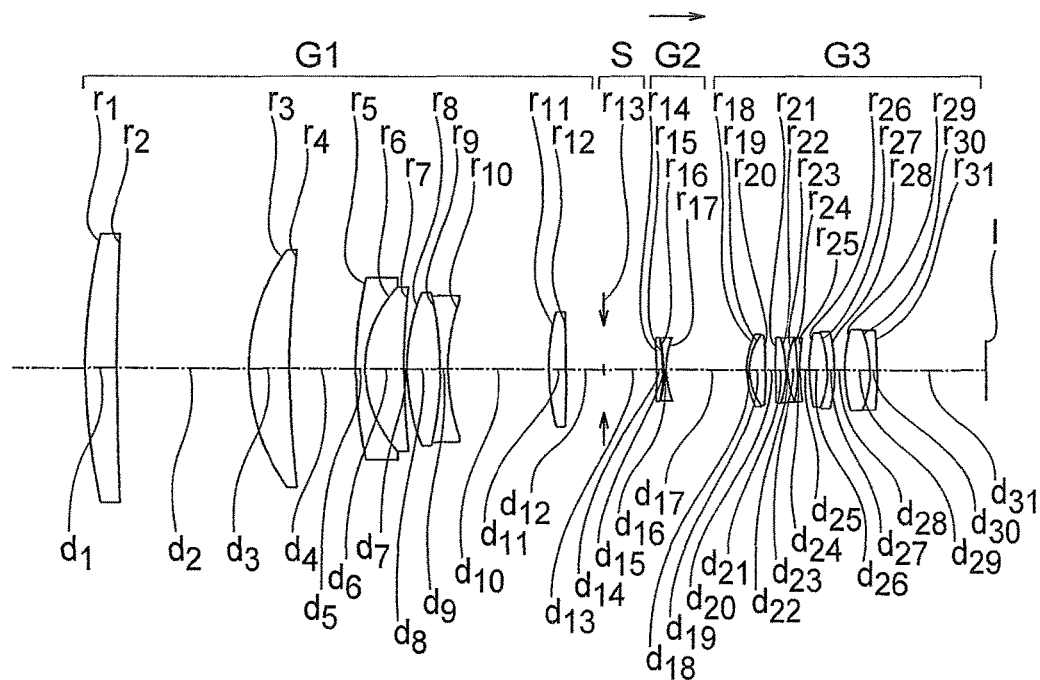
FIG. 7A and FIG. 7B are lens cross-sectional views of a telephoto lens of Example 7.
Figure 7B:
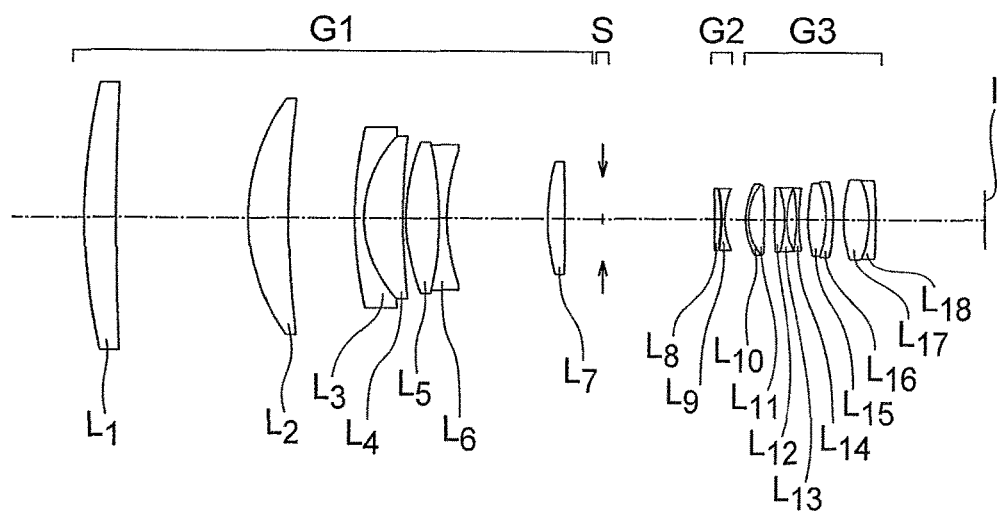
Figure 8A:
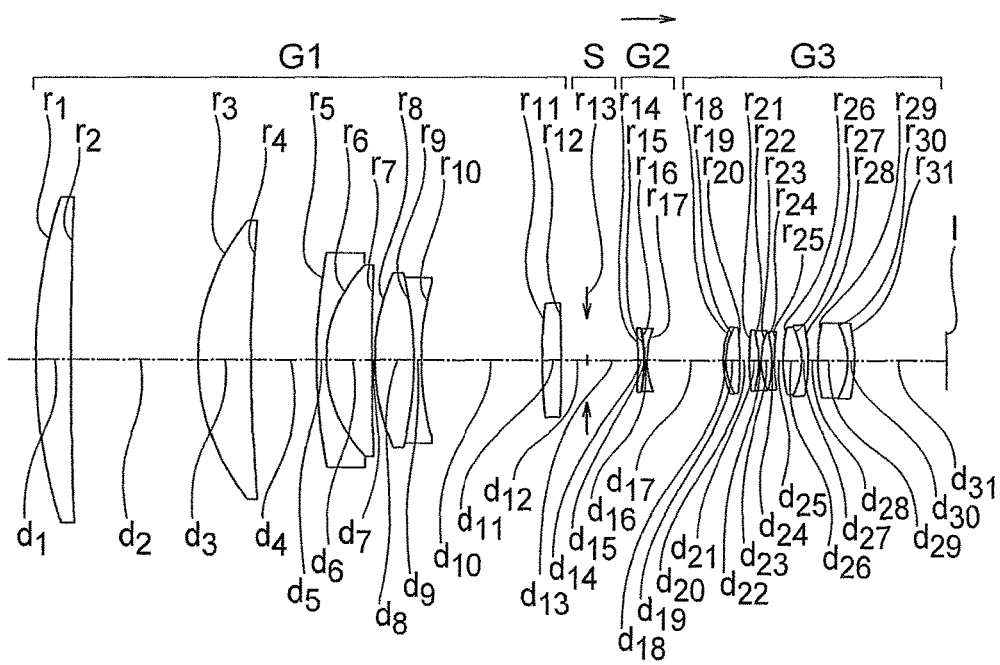
FIG. 8A and FIG. 8B are lens cross-sectional views of a telephoto lens of Example 8.
Figure 8B:
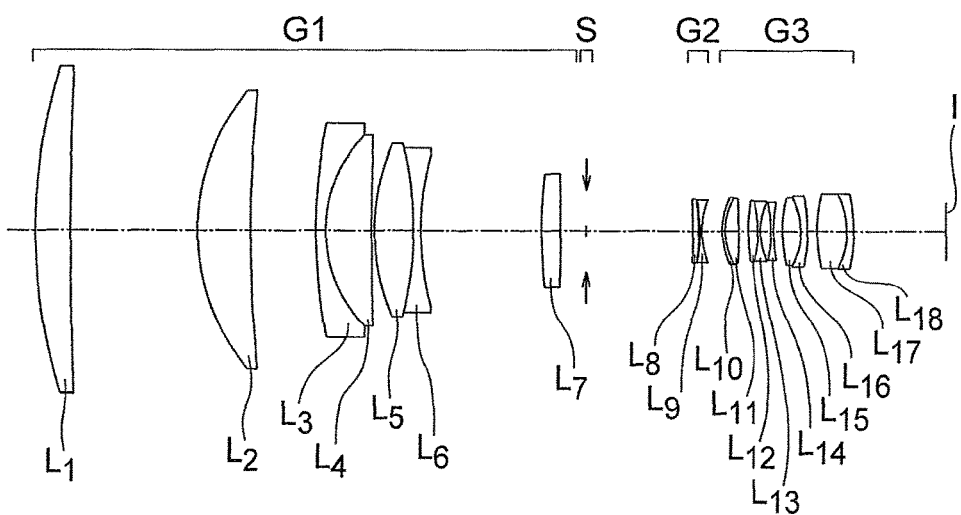
Figure 9A:
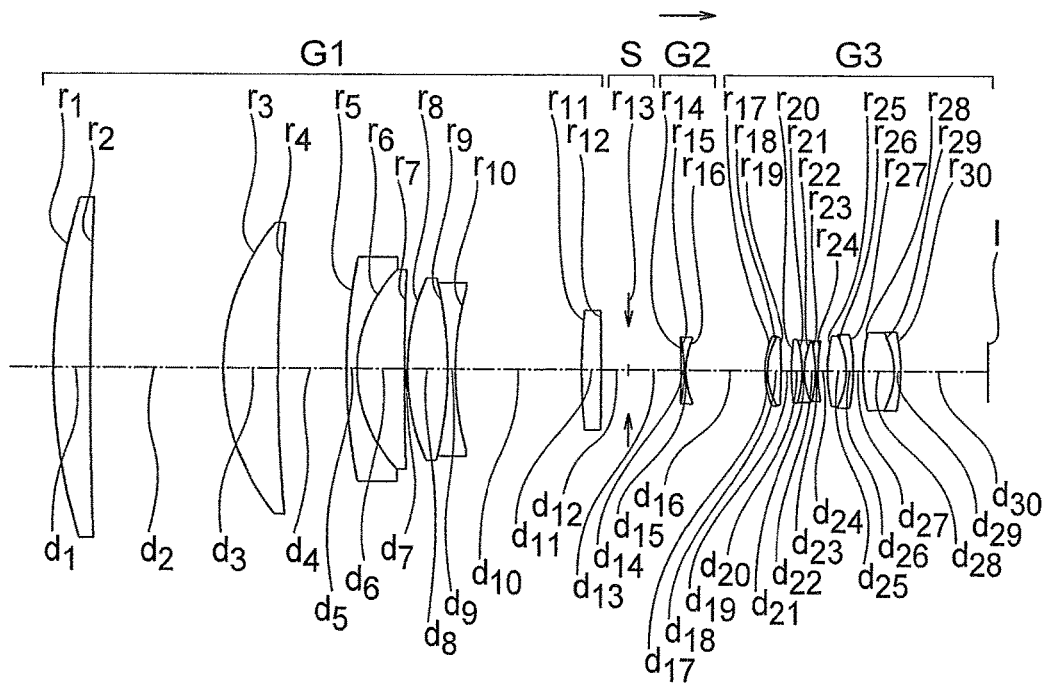
FIG. 9A and FIG. 9B are lens cross-sectional views of a telephoto lens of Example 9.
Figure 9B:
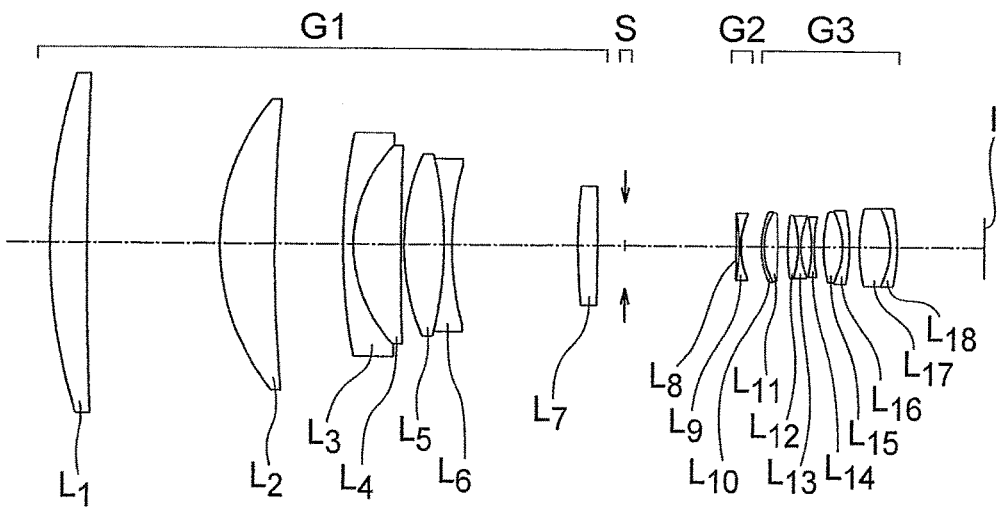

Prior to a description of examples, the operation effects of embodiments according to an aspect of the present invention will be described. When the operation effects of the present embodiment are described, specific examples will be illustrated. However, as is the case with the examples described later, the illustrated aspects are only a few of the aspects included in the present invention, and the aspects include a number of variations. Therefore, the present invention is not limited to the illustrated aspects.

A telephoto lens of a first embodiment includes, in order from an object side, a first lens unit having a positive refractive power, a second lens unit having a negative refractive power, and a third lens unit, and the first lens unit includes, in order from the object side, a front-side lens unit having a positive refractive power and a rear-side lens unit, and at a time of focusing, the second lens unit moves, and the third lens unit has a positive lens and a negative lens, and the front-side lens unit includes lenses positioned closer to the object side than a predetermined negative lens that satisfies following Conditional Expression (a), and the lenses positioned closer to the object side than the predetermined negative lens include a plurality of positive lenses, and the rear-side lens unit has the predetermined negative lens and a positive lens, and following Conditional Expressions (1A) and (14) are satisfied:

$$0.5 \le |f/fLn| \quad (a),$$

$$0.015 \le DGFGR/f \le 0.25 \quad (1A), \text{ and}$$

$$0.19 \le DGFairmax/DGF \le 1.0 \quad (14),$$

where, f is a focal length of the entire telephoto lens;

fLn is a focal length of the predetermined negative lens;

DGFGR is an axial air space between the front-side lens unit and the rear-side lens unit;

DGFairmax is a maximum axial air space, of axial air spaces in the front-side lens unit; and DGF is an axial thickness of the front-side lens unit.

In order to reduce the overall length of the optical system and to ensure favorable imaging performance from the center to the periphery of an image, it is important to ensure optical symmetry in the entire optical system. In the telephoto lens of the first embodiment, the optical system is constructed with a first lens unit having a positive refractive power, a second lens unit having a negative refractive power, and a third lens unit having a positive lens and a negative lens. In this case, with the first lens unit, the second lens unit, and the positive lens in the third lens unit, the refractive powers are disposed in the order of: positive refractive power, negative refractive power, and positive refractive power. That is, refractive powers are in symmetric arrangement. In this way, by adopting the arrangement as described above, in the telephoto lens of the present embodiment, since the optical symmetry can be ensured, it becomes easy to correct coma, distortion, and chromatic aberration of magnification favorably.

In the first lens unit, the front-side lens unit is disposed closest to the object, and the rear-side lens unit is disposed on an image side of the front-side lens unit with an airspace with some degree of width. Then, the front-side lens unit includes lenses positioned closer to the object side than the predetermined negative lens that satisfies Conditional Expression (a), and the lenses positioned closer to the object side than the predetermined negative lens include a plurality of positive lenses. The rear-side lens unit has the predetermined negative lens and a positive lens.

In this way, in the first lens unit, the front-side lens unit includes a plurality of positive lenses, and the rear-side lens unit includes a negative lens and a positive lens. Therefore, it is possible to increase the positive refractive power in the first lens unit while performing correction of spherical aberration and correction of chromatic aberration. Thus, it is possible to enhance telephoto action with a combination of the negative refractive power of the second lens unit. As a result, shortening overall length of the optical system can be achieved.

In the telephoto lens of the first embodiment, the front-side lens unit and the rear-side lens unit are separated from each other by the predetermined negative lens as a boundary. The predetermined negative lens is a negative lens that satisfies Conditional Expression (a) and in which a refractive power is large to some degree. Thus, a negative lens in which a refractive power is large to some degree is not included in the front-side lens unit.

By arranging a negative lens having a large refractive power in the front-side lens unit, it is possible to correct chromatic aberration favorably. However, the volume of the front-side lens unit is largest in the telephoto lens. Therefore, if a negative lens having a large refractive power is disposed in the front-side lens unit, the volume of the negative lens increases. As a result, the optical system increases in size.

Then, the predetermined negative lens is disposed in the rear-side lens unit. By doing so, it is possible to prevent the negative lens having a larger volume from being disposed in the front-side lens unit In addition, by arranging the predetermined negative lens in the rear-side lens unit, it is possible to correct chromatic aberration favorably. Thus, it is possible to achieve both significant reduction in weight of the optical system and favorable correction of chromatic aberration at the same time.

A lens that falls below a lower limit value of Conditional Expression (a) is a lens having a small refractive power. Therefore, even when a negative lens is disposed in the front-side lens unit, the volume of the lens is not increased as long as the negative lens is a lens that falls below the lower limit value of Conditional Expression (a). Moreover, since the refractive power is small, the positive refractive power required for the front-side lens unit can be ensured safely even when such a lens is disposed in the front-side lens unit. Thus, the lens that falls below the lower limit value of Conditional Expression (a) may be disposed in the front-side lens unit.

Examples of the lens that falls below the lower limit value of Conditional Expression (a) include cover glass having a small refractive power, a lens with a thin resin layer having aspheric effects on the lens surface (HBL: hybrid lens), and an optical element having a diffraction-effect surface (DOE: diffractive optical element).

The second lens unit has a negative refractive power. Therefore, it is possible to obtain telephoto action with a combination of the positive refractive power of the first lens unit and the negative refractive power of the second lens unit. As a result, the overall length of the optical system can be reduced.

Since the first lens unit has a positive refractive power, light rays is converged on the side closer to the image side than the first lens unit. That is, the height of light rays is reduced at the position of the second lens unit. Therefore, an outer diameter of the second lens unit becomes small.

In the telephoto lens of the first embodiment, the first lens unit includes the front-side lens unit and the rear-side lens unit, whereby it is possible to correct both spherical aberration and chromatic aberration in the first lens unit favorably. In this case, since the load of aberration correction in the second lens unit is reduced, it is possible to increase the refractive power of the second lens unit. Thus, a reduction in diameter and weight of the second lens unit can be achieved.

Then, in the telephoto lens of the first embodiment, the second lens unit is set as a focus lens unit and focusing is performed in the second lens unit. By doing so, since it is possible to reduce the outer diameter of the focus lens unit, it becomes easy to make the focus lens unit light weight.

Furthermore, when the second lens unit is moved, it follows that the lens unit is moved in the place where the height of light rays is low. Therefore, it becomes easy to ensure high imaging performance on the periphery of the image even at the time of focusing.

By satisfying Conditional Expression (1A), it is possible to ensure a sufficient space between the front-side lens unit and the rear-side lens unit. In this case, since the front-side lens unit and the rear-side lens unit can be separated from each other, it is possible to enhance telephoto action in the first lens unit. As a result, it is possible to reduce the overall length of the optical system. It is further possible to reduce the weight of the lenses positioned closer to the image side than the front-side lens unit.

When falling below a lower limit value of Conditional Expression (1A), since the telephoto action in the first lens unit is weakened, it becomes difficult to reduce the overall length of the optical system. To reduce the overall length of the optical system, the telephoto action may be enhanced with the first lens unit and the second lens unit. However, if doing so, since the optical symmetry is deteriorated, it difficult to ensure favorable imaging performance. In addition, since the weight of the negative lens in the rear-side lens unit is increased, it becomes difficult to make the optical system light weight.

When exceeding an upper limit value of Conditional Expression (1A), since the overall length of the first lens unit is increased, it becomes difficult to reduce the overall length of the optical system.

When falling below a lower limit value of Conditional Expression (14), since the weight of the positive lenses in the front-side lens unit is increased, it becomes difficult to make the optical system light weight. When exceeding an upper limit value of Conditional Expression (14), it becomes difficult to reduce the overall length of the optical system.

It is preferable that following Conditional Expressions (a-1), (a-2), (a-3), or (a-4) is satisfied instead of Conditional Expression (a):

$$0.35 \le |f/fLn| \quad (a\text{-}1),$$

$$0.25 \le |f/fLn| \quad (a\text{-}2),$$

$$0.15 \le |f/fLn| \quad (a\text{-}3), \text{ and}$$

$$0.1 \le |f/fLn| \quad (a\text{-}4).$$

It is preferable that following Conditional Expressions (1A-1), (1A-2), or (1A-3) is satisfied instead of Conditional Expression (1A)

$$0.02 \le DGFGR/f \le 0.2 \quad (1A\text{-}1),$$

$$0.03 \le DGFGR/f \le 0.17 \quad (1A\text{-}2), \text{ and}$$

$$0.04 \le DGFGR/f \le 0.15 \quad (1A\text{-}3).$$

It is preferable that following Conditional Expression (14-1) or (14-2) is satisfied instead of Conditional Expression (14):

$$0.2 \le DGF\text{airmax}/DGF \le 0.9 \quad (14\text{-}1), \text{ and}$$

$$0.25 \le DGF\text{airmax}/DGF \le 0.8 \quad (14\text{-}2).$$

A telephoto lens of a second embodiment includes, in order from the object side, a first lens unit having a positive refractive power, a second lens unit having a negative refractive power, and a third lens unit, and the first lens unit includes, in order from the object side, a front-side lens unit having a positive refractive power, a first rear-side lens unit, and a second rear-side lens unit, and at a time of focusing, the second lens unit moves, and the third lens unit has a positive lens and a negative lens, and the front-side lens unit includes lenses positioned closer to the object side than a predetermined negative lens that satisfies following Conditional Expression (a), and the lenses positioned closer to the object side than the predetermined negative lens include a plurality of positive lenses, and the first rear-side lens unit has the predetermined negative lens and a positive lens, and the second rear-side lens unit has a positive lens, and following Conditional Expressions (2B) and (16) are satisfied:

$$0.5 \le |f/fLn| \quad (a),$$

$$0.10 \le \Delta GFGR1/f \le 0.5 \quad (2B), \text{ and}$$

$$50 \le vdLp1 \quad (16),$$

where, f is the focal length of the entire telephoto lens;

fLn is the focal length of the predetermined negative lens;

$\Delta GFGR1$ is an axial air space from an object-side surface in the front-side lens unit to an object-side surface in the first rear-side lens unit; and vdLp1 is an Abbe number of a positive lens positioned closest to the object.

In order to reduce the overall length of the optical system and to ensure favorable imaging performance from the center to the periphery of the image, it is important to ensure optical symmetry in the entire optical system. In the telephoto lens of the second embodiment, the optical system is constructed with a first lens unit having a positive refractive power, a second lens unit having a negative refractive power, and a third lens unit having a positive lens and a negative lens. By adopting such arrangement, as described above, in the telephoto lens of the present embodiment, since the optical symmetry can be ensured, it becomes easy to correct coma, distortion, and chromatic aberration of magnification favorably.

In the first lens unit, the front-side lens unit is disposed closest to the object, and the rear-side first lens unit is disposed on the image side of the front-side lens unit with an air space with some degree of width. Then, the front-side lens unit includes lenses positioned closer to the object side than the predetermined negative lens that satisfies Conditional Expression (a), and the lenses positioned closer to the object side than the predetermined negative lens include a plurality of positive lenses. The first rear-side lens unit has the predetermined negative lens and a positive lens.

In this way, in the first lens unit, the front-side lens unit includes a plurality of positive lenses, and the first rear-side lens unit includes a negative lens and a positive lens. Therefore, it is possible to enhance telephoto action in the first lens unit while performing correction of spherical aberration and correction of chromatic aberration. As a result, shortening the overall length of the optical system can be achieved.

In the telephoto lens of the second embodiment, the front-side lens unit and the first rear-side lens unit are separated from each other by the predetermined negative lens as a boundary. The predetermined negative lens is a negative lens that satisfies Conditional Expression (a) and in which a refractive power is large to some extent. Thus, a negative lens in which a refractive power is large to some degree is not included in the front-side lens unit.

By arranging a negative lens having a large refractive power in the front-side lens unit, it is possible to correct chromatic aberration favorably. However, the volume of the front-side lens unit is largest in the telephoto lens. Therefore, if a negative lens having a large refractive power is disposed in the front-side lens unit, the volume of the negative lens increases. As a result, the optical system increases in size.

Then, the predetermined negative lens is disposed in the first rear-side lens unit. By doing so, it is possible to prevent the negative lens having a larger volume from being disposed in the front-side lens unit. In addition, by arranging the predetermined negative lens in the first rear-side lens unit, it is possible to correct chromatic aberration favorably. Thus, it is possible to achieve both significant reduction in weight of the optical system and favorable correction of chromatic aberration at the same time.

A lens that falls below the lower limit value of Conditional Expression (a) is a lens having a small refractive power. Therefore, even when a negative lens is disposed in the front-side lens unit, the volume of the lens is not increased as long as the negative lens is a lens that falls below the lower limit value of Conditional Expression (a). Moreover, since the refractive power is small, the positive refractive power required for the front-side lens unit can be ensured safely even when such a lens is disposed in the front-side lens unit. Thus, the lens that falls below the lower limit value of Conditional Expression (a) may be disposed in the front-side lens unit.

Examples of the lens that falls below the lower limit value of Conditional Expression (a) include cover glass having a small refractive power, a lens with a thin resin layer having aspheric effects on the lens surface (HBL: hybrid lens), and an optical element having a diffraction-effect surface (DOE: diffractive optical element).

On the image side of the first rear-side lens unit, the second rear-side lens unit is disposed with an air space interposed. The second rear-side lens unit has a positive lens. By the positive lenses in the front-side lens unit, the negative lens and the positive lens in the first rear-side lens unit, and the positive lens in the second rear-side lens unit, it is possible to enhance the correction effect for aberrations such as spherical aberration, astigmatism, longitudinal chromatic aberration, and chromatic aberration of magnification in the first lens unit. Therefore, it becomes possible to reduce the amount of aberration in the lens units positioned closer to the image side than the first lens unit. As a result, even when the overall length of the optical system is reduced, it is easier to reduce the weight of the lens units positioned closer to the image side than the first lens unit and to ensure high imaging performance at the time of focusing.

The second lens unit has a negative refractive power. Therefore, it is possible to obtain telephoto action with a combination of the positive refractive power of the first lens unit and the negative refractive power of the second lens unit. As a result, the overall length of the optical system can be reduced.

Since the first lens unit has a positive refractive power, light rays is converged on the side closer to the image side than the first lens unit. That is, the height of light rays is reduced at the position of the second lens unit. Therefore, the outer diameter of the second lens unit becomes small.

In the telephoto lens of the second embodiment, the first lens unit includes the front-side lens unit, the first rear-side lens unit, and the second rear-side lens unit, whereby it is possible to correct both spherical aberration and chromatic aberration in the first lens unit favorably. In this case, since the load of aberration correction in the second lens unit is reduced, it is possible to increase the refractive power of the second lens unit. Thus, a reduction in diameter and weight of the second lens unit can be achieved.

Then, in the telephoto lens of the second embodiment, the second lens unit is set as a focus lens unit and focusing is performed in the second lens unit. By doing so, since it is possible to reduce the outer diameter of the focus lens unit, it becomes easy to make the focus lens unit light weight.

Furthermore, when the second lens unit is moved, it follows that the lens unit is moved in the place where the height of light rays is low. Therefore, it becomes easy to ensure high imaging performance on the periphery of the image even at the time of focusing.

By satisfying Conditional Expression (2B), it is possible to ensure a sufficient space between the front-side lens unit and the first rear-side lens unit. In this case, since the front-side lens unit and the first rear-side lens unit can be separated from each other, it is possible to enhance telephoto action in the first lens unit. As a result, it is possible to reduce the overall length of the optical system. It is further possible to reduce the weight of the lenses positioned closer to the image side than the front-side lens unit.

When falling below a lower limit value of Conditional Expression (2B), since the telephoto action in the first lens unit is weakened, it becomes difficult to reduce the overall length of the optical system. To reduce the overall length of the optical system, the telephoto action may be enhanced with the first lens unit and the second lens unit. However, if doing so, since the optical symmetry is deteriorated, it difficult to ensure favorable imaging performance. In addition, since the weight of the negative lens in the first rear-side lens unit is increased, it becomes difficult to make the optical system light weight.

When exceeding an upper limit value of Conditional Expression (2B), since the overall length of the first lens unit is increased, it becomes difficult to reduce the overall length of the optical system.

When falling below a lower limit value of Conditional Expression (16), since longitudinal chromatic aberration in the first sub-lens unit is increased, favorable imaging performance is not achieved. Alternatively, when favorable imaging performance is to be achieved, it is difficult to reduce the overall length of the optical system.

It is preferable that following Conditional Expression (2B-1) or (2B-2) is satisfied instead of Conditional Expression (2B):

$$0.12 \leq \Delta GFGR1/f \leq 0.45 \quad (2B\text{-}1),\text{ and}$$

$$0.13 \leq \Delta GFGR1/f \leq 0.4 \quad (2B\text{-}2).$$

It is preferable that any one of following Conditional Expressions (16-1), (16-2), and (16-3) is satisfied instead of Conditional Expression (16):

$$55 \leq vdLp1 \quad (16\text{-}1),$$

$$62 \leq vdLp1 \quad (16\text{-}2),\text{ and}$$

$$65 \leq vdLp1 \quad (16\text{-}3).$$

A telephoto lens of a third embodiment includes, in order from the object side, a first lens unit having a positive refractive power, a second lens unit having a negative refractive power, and a third lens unit, and the first lens unit includes, in order from the object side, a front-side lens unit having a positive refractive power, a first rear-side lens unit, and a second rear-side lens unit, and at a time of focusing, the second lens unit moves, and the third lens unit has a positive lens and a negative lens, and the front-side lens unit includes a lens positioned closer to the object side than a predetermined negative lens that satisfies following Conditional Expression (a), and the lens positioned closer to the object side than the predetermined negative lens includes a positive lens, and the first rear-side lens unit has the predetermined negative lens and a positive lens, and the second rear-side lens unit has a positive lens, and following Conditional Expressions (2B) and (3) below are satisfied:

$$0.5 \leq |f/fLn| \quad (a),$$

$$0.10 \leq \Delta GFGR1/f \leq 0.5 \quad (2B),\text{ and}$$

$$72 \leq vdGFave \quad (3),$$

where,
f is the focal length of the entire telephoto lens;
fLn is the focal length of the predetermined negative lens;
$\Delta GFGR1$ is an axial air space from an object-side surface in the front-side lens unit to an object-side surface in the first rear-side lens unit; and
vdGFave is an average Abbe number of the positive lens in the front-side lens unit.

In order to reduce the overall length of the optical system and to ensure favorable imaging performance from the center to the periphery of the image, it is important to ensure optical symmetry in the entire optical system. In the telephoto lens of the third embodiment, the optical system is constructed with a first lens unit having a positive refractive power, a second lens unit having a negative refractive power, and a third lens unit having a positive lens and a negative lens. By adopting such arrangement, as described above, in the telephoto lens of the present embodiment, since the optical symmetry can be ensured, it becomes easy to correct coma, distortion, and chromatic aberration of magnification favorably.

In the first lens unit, the front-side lens unit is disposed closest to the object, and the rear-side first lens unit is disposed on the image side of the front-side lens unit with an air space with some degree of width. Then, the front-side lens unit includes a lens positioned closer to the object side than a predetermined negative lens that satisfies Conditional Expression (a), and the lens positioned closer to the object side than the predetermined negative lens includes a positive lens. The first rear-side lens unit has the predetermined negative lens and a positive lens.

In this way, in the first lens unit, the front-side lens unit includes a positive lens, and the first rear-side lens unit includes a negative lens and a positive lens. Therefore, it is possible to enhance telephoto action in the first lens unit while performing correction of spherical aberration and correction of chromatic aberration. As a result, shortening the overall length of the optical system can be achieved.

In the telephoto lens of the third embodiment, the front-side lens unit and the first rear-side lens unit are separated from each other by the predetermined negative lens as a boundary. The predetermined negative lens is a negative lens that satisfies Conditional Expression (a) and in which a refractive power is large to some extent. Thus, a negative lens in which a refractive power is large to some extent is not included in the front-side lens unit.

By arranging a negative lens having a large refractive power in the front-side lens unit, it is possible to correct chromatic aberration favorably. However, the volume of the front-side lens unit is largest in the telephoto lens. Therefore, if a negative lens having a large refractive power is disposed in the front-side lens unit, the volume of the negative lens increases. As a result, the optical system increases in size.

Then, the predetermined negative lens is disposed in the first rear-side lens unit. By doing so, it is possible to prevent a negative lens having a larger volume from being disposed in the front-side lens unit. In addition, by arranging the predetermined negative lens in the first rear-side lens unit, it is possible to correct chromatic aberration favorably. Thus, it is possible to achieve both significant reduction in weight of the optical system and favorable correction of chromatic aberration at the same time.

A lens that falls below the lower limit value of Conditional Expression (a) is a lens having a small refractive power. Therefore, even when a negative lens is disposed in the front-side lens unit, the volume of the lens is not increased as long as the negative lens is a lens that falls below the lower limit value of Conditional Expression (a). Furthermore, since the refractive power is small, the positive refractive power required for the front-side lens unit can be ensured safely even when such a lens is disposed in the front-side lens unit. Thus, the lens that falls below the lower limit value of Conditional Expression (a) may be disposed in the front-side lens unit.

Examples of the lens that falls below the lower limit value of Conditional Expression (a) include cover glass having a small refractive power, a lens with a thin resin layer having aspheric effects on the lens surface (HBL: hybrid lens), and an optical element having a diffraction-effect surface (DOE: diffractive optical element).

On the image side of the first rear-side lens unit, the second rear-side lens unit is disposed with an air space interposed. The second rear-side lens unit has a positive lens. By the positive lens in the front-side lens unit, the negative lens and the positive lens in the first rear-side lens unit, and the positive lens in the second rear-side lens unit, it is possible to enhance the correction effect for aberrations such as spherical aberration, astigmatism, longitudinal chromatic aberration, and chromatic aberration of magnification in the first lens unit. Therefore, it becomes possible to reduce the amount of aberration in the lens units positioned closer to the image side than the first lens unit. As a result, even when the overall length of the optical system is reduced, it is easier to reduce the weight of the lens units positioned closer to the image side than the first lens unit and to ensure high imaging performance at the time of focusing.

The second lens unit has a negative refractive power. Therefore, it is possible to obtain telephoto action with a combination of the positive refractive power of the first lens unit and the negative refractive power of the second lens unit. As a result, the overall length of the optical system can be reduced.

Since the first lens unit has a positive refractive power, light rays is converged on the side closer to the image side than the first lens unit. That is, the height of light rays is reduced at the position of the second lens unit. Therefore, the outer diameter of the second lens unit becomes small.

In the telephoto lens of the third embodiment, the first lens unit includes the front-side lens unit, the first rear-side lens unit, and the second rear-side lens unit, whereby it is possible to correct both spherical aberration and chromatic aberration in the first lens unit favorably. In this case, since the load of aberration correction in the second lens unit is reduced, it is possible to increase the refractive power of the second lens unit. Thus, a reduction in diameter and weight of the second lens unit can be achieved.

Then, in the telephoto lens of the third embodiment, the second lens unit is set as a focus lens unit and focusing is performed in the second lens unit. By doing so, since it is possible to reduce the outer diameter of the focus lens unit, it becomes easy to make the focus lens unit light weight.

Furthermore, when the second lens unit is moved, it follows that the lens unit is moved in the place where the height of light rays is low. Therefore, it becomes easy to ensure high imaging performance on the periphery of the image even at the time of focusing.

The technical meaning of Conditional Expression (2B) has already been described and the description is omitted here.

In a telephoto lens, size reduction of the optical system is required in addition to ensuring favorable imaging performance. In order to obtain favorable imaging performance in a telephoto lens, it is mainly necessary to suppress occurrence of longitudinal chromatic aberration. On the other hand, in order to achieve size reduction of the optical system, it is necessary to increase the positive refractive power of a lens unit positioned closer to the object side. However, in doing so, longitudinal chromatic aberration is more likely to occur.

When falling below a lower limit value of Conditional Expression (3), since the amount of longitudinal chromatic aberration is increased, it becomes difficult to reduce the overall length of the optical system.

It is preferable that following Conditional Expressions (3-1), (3-2), (3-3), or (3-4) is satisfied instead of Conditional Expression (3):

$$75 \leq vdGFave \qquad (3\text{-}1),$$

$$77 \leq vdGFave \qquad (3\text{-}2),$$

$$80 \leq vdGFave \qquad (3\text{-}3), \text{ and}$$

$$82 \leq vdGFave \qquad (3\text{-}4).$$

In the telephoto lens of the first embodiment, it is preferable that the rear-side lens unit have a first rear-side lens unit and a second rear-side lens unit.

The front-side lens unit, the first rear-side lens unit, and the second rear-side lens unit are sub-lens units that constitute the first lens unit. The technical meaning of constituting the first lens unit with three sub-lens units has already described and the description is omitted here.

In the telephoto lens of the first embodiment, the telephoto lens of the second embodiment, and the telephoto lens of the third embodiment (hereinafter referred to as "the telephoto lens of the present embodiment"), it is preferable that the first rear-side lens unit have a negative refractive power.

By doing so, enhancing telephoto action in the first lens unit is further facilitated. As a result, it becomes easy to reduce the overall length of the optical system. Furthermore, the refractive powers in the first lens unit are disposed in the order of: positive refractive power (front-side lens unit) and negative refractive power (first rear-side lens unit). Here, when the second rear-side lens unit has a positive refractive power, the refractive powers in the first lens unit are disposed in the order of: positive refractive power, negative refractive power, and positive refractive power. Such refractive power arrangement can further enhance the correction effect for aberrations such as spherical aberration, astigmatism, longitudinal chromatic aberration, and chromatic aberration of magnification in the first lens unit.

In the telephoto lens of the present embodiment, it is preferable that the second rear-side lens unit have a positive refractive power.

By doing so, the refractive powers in the first lens unit are disposed in the order of: positive refractive power, negative refractive power, and positive refractive power. Such refractive power arrangement can further enhance the correction effect for aberrations such as spherical aberration, astigmatism, longitudinal chromatic aberration, and chromatic aberration of magnification in the first lens unit.

In the telephoto lens of the second embodiment and the telephoto lens of the third embodiment, it is preferable that following Conditional Expression (1B) is satisfied:

$$0.015 \leq DGFGR1/f \leq 0.25 \quad (1B),$$

where,

DGFGR1 is an axial air space between the front-side lens unit and the first rear-side lens unit; and f is the focal length of the entire telephoto lens.

The technical meaning of Conditional Expression (1B) is the same as the technical meaning of Conditional Expression (1A).

It is preferable that following Conditional Expressions (1B-1), (1B-2), or (1B-3) is satisfied instead of Conditional Expression (1B):

$$0.02 \leq DGFGR1/f \leq 0.2 \quad (1B-1),$$

$$0.03 \leq DGFGR1/f \leq 0.17 \quad (1B-2), \text{ and}$$

$$0.04 \leq DGFGR1/f \leq 0.15 \quad (1B-3).$$

In the telephoto lens of the first embodiment, it is preferable that following Conditional Expression (2A) is satisfied:

$$0.10 \leq \Delta GFGR/f \leq 0.5 \quad (2A),$$

where,

ΔGFGR is an axial air space from an object-side surface in the front-side lens unit to an object-side surface in the rear-side lens unit; and f is the focal length of the entire telephoto lens.

The technical meaning of Conditional Expression (2A) is the same as the technical meaning of Conditional Expression (2B).

It is preferable that following Conditional Expression (2A-1) or (2A-2) is satisfied instead of Conditional Expression (2A):

$$0.12 \leq \Delta GFGR/f \leq 0.45 \quad (2A\text{-}1), \text{ and}$$

$$0.13 \leq \Delta GFGR/f \leq 0.4 \quad (2A\text{-}2).$$

In the telephoto lens of the first embodiment, when the rear-side lens unit has the first rear-side lens unit and the second rear-side lens unit, it is preferable that above-mentioned Conditional Expression (2A) is satisfied.

In the telephoto lens of the first embodiment and the telephoto lens of the second embodiment, it is preferable that following Conditional Expression (3) is satisfied:

$$72 \leq vdGFave \quad (3),$$

where, vdGFave is the average Abbe number of the positive lens in the front-side lens unit.

The technical meaning of Conditional Expression (3) has already been described and the description is omitted here.

In the telephoto lens of the present embodiment, it is preferable that following Conditional Expression (3-2) is satisfied:

$$77 \leq vdGFave \quad (3\text{-}2),$$

where, vdGFave is the average Abbe number of the positive lens in the front-side lens unit.

The technical meaning of Conditional Expression (3-2) is the same as the technical meaning of Conditional Expression (3).

In the telephoto lens of the present embodiment, it is preferable that following Conditional Expression (4) is satisfied:

$$84 \leq vdGFmax \quad (4),$$

where, vdGFmax is a largest Abbe number, of Abbe numbers of the positive lens in the front-side lens unit.

The technical meaning of Conditional Expression (4) is the same as the technical meaning of Conditional Expression (3).

It is preferable that following Conditional Expression (4-1) or (4-2) is satisfied instead of Conditional Expression (4):

$$90 \leq vdGFmax \quad (4\text{-}1), \text{ and}$$

$$94 \leq vdGFmax \quad (4\text{-}2).$$

In the telephoto lens of the present embodiment, it is preferable that following Conditional Expression (5) is satisfied:

$$0.02 \leq DGR1GR2/f \leq 0.3 \quad (5),$$

where,

DGR1GR2 is an axial air space between the first rear-side lens unit and the second rear-side lens unit; and f is the focal length of the entire telephoto lens.

When falling below a lower limit value of Conditional Expression (5), the difference is reduced between the light ray height in the first rear-side lens unit and the light ray height in the second rear-side lens unite Therefore, it becomes impossible to enhance the correction effect for aberrations such as spherical aberration, astigmatism, longitudinal chromatic aberration, and chromatic of magnification aberration. When exceeding an upper limit value of Conditional Expression (5), it becomes difficult to reduce the overall length of the optical system.

It is preferable that following Conditional Expression (5-1), (5-2), or (5-3) is satisfied instead of Conditional Expression (5):

$$0.03 \leq DGR1GR2/f \leq 0.25 \quad (5\text{-}1),$$

$$0.04 \leq DGR1GR2/f \leq 0.23 \quad (5\text{-}2), \text{ and}$$

$$0.05 \leq DGR1GR2/f \leq 0.2 \quad (5\text{-}3).$$

In the telephoto lens of the third embodiment, it is preferable that the front-side lens unit have a plurality of positive lenses.

By doing so, it is possible to distribute positive refractive power among a plurality of lenses even when the refractive power of the front-side lens unit is increased. Therefore, it is possible to suppress occurrence of spherical aberration. Moreover, it is possible to enhance telephoto action in the first lens unit, it is easy to reduce the overall length of the optical system.

In the telephoto lens of the present embodiment, it is preferable that following Conditional Expression (6) is satisfied:

$$0.2 \leq fGF/f \leq 0.8 \quad (6),$$

where,
fGF is a focal length of the front-side lens unit; and
f is the focal length of the entire telephoto lens.

When falling below a lower limit value of Conditional Expression (6), the amount of axial chromatic aberration and the amount of spherical aberration in the front-side lens unit is increased. Therefore, favorable imaging performance cannot be obtained. When exceeding an upper limit value of Conditional Expression (6), it becomes difficult to reduce the size of the optical system.

It is preferable that following Conditional Expression (6-1) or (6-2) is satisfied instead of Conditional Expression (6):

$$0.25 \leq fGF/f \leq 0.6 \quad (6\text{-}1), \text{ and}$$

$$0.28 \leq fGF/f \leq 0.47 \quad (6\text{-}2).$$

In the telephoto lens of the present embodiment, it is preferable that a first lens is disposed closest to the object and following Conditional Expression (7) is satisfied:

$$1.6 \leq fL1/fGF \leq 5.0 \quad (7),$$

where,
fL1 is a focal length of the first lens; and
fGF is the focal length of the front-side lens unit.

When falling below a lower limit value of Conditional Expression (7), the positive refractive power of the first lens becomes too large. In this case, the amount of spherical aberration in the front-side lens unit is increased. Therefore, it becomes difficult to reduce the size of the optical system.

When exceeding an upper limit value of Conditional Expression (7), the positive refractive power of the first lens becomes too small. In this case, the positive refractive power of the front-side lens unit becomes also small. If an adequate positive refractive power is to be ensured in the front-side lens unit, the load of refractive power in the lenses positioned closer to the image side than the first lens is increased. As a result, the amount of spherical aberration in the front-side lens unit is increased. Therefore, it becomes difficult to reduce the size of the optical system.

It is preferable that following Conditional Expression (7-1), (7-2), or (7-3) is satisfied instead of Conditional Expression (7):

$$1.8 \leq fL1/fGF \leq 4.5 \quad (7\text{-}1),$$

$$1.9 \leq fL1/fGF \leq 4.0 \quad (7\text{-}2), \text{ and}$$

$$2.0 \leq fL1/fGF \leq 3.5 \quad (7\text{-}3).$$

In the telephoto lens of the present embodiment, it is preferable that following Conditional Expression (8) is satisfied:

$$-3.0 \leq fGF/fGR1 \leq 0.1 \quad (8),$$

where,
fGF is the focal length of the front-side lens unit; and
fGR1 is a focal length of the first rear-side lens unit.

When falling below a lower limit value of Conditional Expression (8), spherical aberration is overcorrected. Therefore, favorable imaging performance cannot be obtained. When exceeding an upper limit value of Conditional Expression (8), the negative refractive power of the first rear-side lens unit becomes too small. Therefore, it becomes difficult to reduce the overall length of the optical system.

It is preferable that following Conditional Expression (8-1), (8-2), or (8-3) is satisfied instead of Conditional Expression (8):

$$-2.5 \leq fGF/fGR1 \leq 0.0 \quad (8\text{-}1),$$

$$-2.0 \leq fGF/fGR1 \leq -0.2 \quad (8\text{-}2), \text{ and}$$

$$-1.8 \leq fGF/fGR1 \leq -0.3 \quad (8\text{-}3).$$

In the telephoto lens of the present embodiment, it is preferable that following Conditional Expression (9) is satisfied:

$$0.06 \leq |fG2/f| \leq 0.25 \quad (9),$$

where,
fG2 is a focal length of the second lens unit; and
f is the focal length of the entire telephoto lens.

In the second lens unit, light rays are refracted in a direction away from the optical axis. When falling below a lower limit value of Conditional Expression (9), light rays are refracted in a direction further away from the optical axis. As a result, the lens diameter of the third lens unit is increased. Therefore, it becomes difficult to reduce the size of the optical system.

The second lens unit functions as a focus lens unit. When exceeding an upper limit value of Conditional Expression (9), the refractive power of the second lens unit becomes too small. In this case, since the amount of movement of the imaging position relative to the amount of movement of the second lens unit (focus lens unit) (hereinafter referred to as "focus sensitivity") is too small, the amount of movement of the second lens unit at the time of focusing is increased. Therefore, it becomes difficult to reduce the overall length of the optical system. Moreover, telephoto action obtained with the first lens unit and the second lens unit is reduced. Therefore, it becomes difficult to reduce the overall length of the optical system.

It is preferable that following Conditional Expression (9-1) or (9-2) is satisfied instead of Conditional Expression (9):

$$0.07 \leq |fG2/f| \leq 0.2 \quad (9\text{-}1), \text{ and}$$

$$0.08 \leq |fG2/f| \leq 0.15 \quad (9\text{-}2).$$

In the telephoto lens of the present embodiment, it is preferable that following Conditional Expression (10) is satisfied:

$$3.5 \leq |MGG2B^2 \times (MGG2^2 - 1)| \leq 6.5 \quad (10),$$

where,
MGG2B is a lateral magnification of a first rear-side lens system;
MGG2 is a lateral magnification of the second lens unit;

the lateral magnification is a lateral magnification at the time of focusing on an infinite object; and the first rear-side lens system is a lens system constituted with all of the lenses positioned closer to the image side than the second lens unit.

When falling below a lower limit value of Conditional Expression (10), the amount of movement of the second lens unit at the time of focusing is too large. Therefore, it becomes difficult to reduce the overall length of the optical system. When exceeding an upper limit value of Conditional Expression (10), it becomes difficult to control the position of the second lens unit at the time of focusing. Therefore, accurate focusing cannot be achieved.

It is preferable that following Conditional Expression (10-1) or (10-2) is satisfied instead of Conditional Expression (10):

$$3.8 \le |MGG2B^2 \times (MGG2^2-1)| \le 6.0 \quad (10\text{-}1), \text{ and}$$

$$4.0 \le |MGG2B^2 \times (MGG2^2-1)| \le 5.6 \quad (10\text{-}2).$$

In the telephoto lens of the present embodiment, it is preferable that the second lens unit include two or less lenses.

As described above, in the telephoto lens of the present embodiment, the optical symmetry is ensured. Thus, coma, distortion, and chromatic aberration of magnification are corrected favorably. Therefore, even when the arrangement of the second lens unit is simplified, it is possible to ensure high imaging performance at the time of focusing.

Then, the second lens unit is constituted with two or less lenses. By doing so, it is possible to reduce the weight of the second lens unit, that is, the focus lens unit, while keeping high imaging performance even at the time of focusing.

In the telephoto lens of the present embodiment, it is preferable that the second lens unit includes a lens having a positive refractive power and a lens having a negative refractive power.

By doing so, it is possible to reduce the amount of longitudinal chromatic aberration and the amount of chromatic aberration of magnification in the second lens unit. As a result, it is possible to ensure stable imaging performance at the time of focusing. Furthermore, the second lens unit includes two lenses whereby it is possible to reduce the weight of the second lens unit while keeping high imaging performance.

In the telephoto lens of the present embodiment, it is preferable that the second lens unit have a plastic lens having a positive refractive power and a plastic lens having a negative refractive power, and following Conditional Expression (11) is satisfied:

$$-0.6 \le fPLn/fPLp \le -0.15 \quad (11),$$

where, fPLn is a focal length of the plastic lens having a negative refractive power; and fPLp is a focal length of the plastic lens having a positive refractive power.

The second lens unit functions as a focus lens unit. Then, by using a plastic lens for the second lens unit, it is possible to reduce the weight of the second lens unit. Thus, it is possible to move the second lens unit at high speed at the time of focusing. As a result, it is possible to achieve fast focusing.

Furthermore, the refractive power of one of the plastic lenses is a positive refractive power and the refractive power of the other plastic lens is a negative refractive power, whereby it is possible to keep stable imaging performance even when a temperature change occurs.

When falling below a lower limit value of Conditional Expression (11), aberration variation due to temperature change becomes too large in the other plastic lens compared with the one plastic lens. In particular, variation of spherical aberration and variation of curvature of field become too large. Therefore, it becomes impossible to cancel variation of spherical aberration and variation of field curvature of field occurring in one plastic lens, with the other plastic lens. Therefore, favorable imaging performance cannot be obtained.

Also when exceeding an upper limit value of Conditional Expression (11), the result is similar to when falling below the lower limit value of Conditional Expression (11).

It is preferable that following Conditional Expression (11-1) or (11-2) is satisfied instead of Conditional Expression (11):

$$-0.5 \le fPLn/fPLp \le -0.17 \quad (11\text{-}1), \text{ and}$$

$$-0.43 \le fPLn/fPLp \le -0.2 \quad (11\text{-}2).$$

In the telephoto lens of the present embodiment, it is preferable that the second lens unit have a plastic lens having a positive refractive power and a glass lens having a negative refractive power, the plastic lens and the glass lens are integrally molded, and following Conditional Expression (12) is satisfied:

$$0.2 \le |fG2/fPLp| \le 0.7 \quad (12),$$

where, fG2 is the focal length of the second lens unit; and fPLp is the focal length of the plastic lens having a positive refractive power.

The second lens unit functions as a focus lens unit. Then, by using a plastic lens for the second lens unit, it is possible to reduce the weight of the second lens unit. Thus, it is possible to move the second lens unit at high speed at the time of focusing. As a result, it is possible to achieve fast focusing.

Moreover, by combining a glass lens with a plastic lens, it is possible to correct chromatic aberration favorably. Furthermore, by integrally molding the glass lens and the plastic lens, it is possible to alleviate an assembly error at a time of assembling into a frame member.

As described above, the second lens unit functions as a focus lens unit. In order to stabilize imaging performance at the time of focusing, for example, it is necessary to suppress variation of refractive power due to temperature change. The rigidity of plastic lenses is lower than the rigidity of glass. Therefore, the amount of change in shape of plastic lenses in temperature change is almost seven times larger than that of glass.

When the shape of a lens changes, the refractive power also changes. Then, a glass lens is used for the negative lens and a plastic lens is used for the positive lens. In this case, since the rigidity of the negative lens is high, a change in shape of the negative lens can be minimized even when the positive lens is deformed due to temperature change. As a result, it is possible to suppress variation of refractive power of the negative lens.

The negative refractive power of the second lens unit is provided by the refractive power of the negative lens. Thus, by suppressing the variation of refractive power of the negative lens, it is possible to suppress variation of negative refractive power of the second lens unit. As a result, it is possible to stabilize imaging performance at the time of focusing.

When falling below a lower limit value of Conditional Expression (12), deformation at a time of temperature change increases. In this case, variation of spherical aberration and variation of curvature of field are increased. Therefore, favorable imaging performance cannot be obtained.

Also when exceeding an upper limit value of Conditional Expression (12), the result is similar to when falling below the lower limit value of Conditional Expression (12).

It is preferable that following Conditional Expression (12-1) or (12-2) is satisfied instead of Conditional Expression (12):

$$0.25 \leq |fG2/fPLp| \leq 0.6 \quad (12\text{-}1), \text{ and}$$

$$0.3 \leq |fG2/fPLp| \leq 0.5 \quad (12\text{-}2).$$

In the telephoto lens of the present embodiment, it is preferable that the third lens unit have a camera shake-correction lens unit and the camera shake-correction lens unit move in a direction vertical to the optical axis.

By moving one or more lenses in a direction vertical to the optical axis, it is possible to correct a shift of the imaging position due to camera shake. Here, if the lens to be moved (hereinafter referred to as "camera shake-correction lens") is compact and lightweight, it is possible to quickly correct a shift of the imaging position.

In a telephoto-type optical system, the second lens unit and the third lens unit are units having a small diameter. Then, by constituting the camera shake-correction lens unit with the lenses in the third lens unit, it is possible to reduce the diameter and weight of the camera shake-correction lens. Thus, it is possible to enhance the responsivity of the camera shake-correction lens unit. As a result, it is possible to correct a shift of the imaging position due to camera shake at high speed.

In the telephoto lens of the present embodiment, it is preferable that the third lens unit has a sub-lens unit on the object side and the sub-lens unit have a refractive power with a sign different from that of the camera shake-correction lens unit.

By doing so, it is possible to increase the amount of shift of the imaging position relative to the amount of shift of the camera shake-correction lens unit (hereinafter referred to as "camera shake-correction sensitivity"). That is, it is possible to reduce the amount of shift of the camera shake-correction lens unit. As a result, it is possible to correct a shift of the imaging position due to camera shake at high speed.

In the telephoto lens of the present embodiment, it is preferable that the third lens unit has a sub-lens unit on the image side and the sub-lens unit have a refractive power with a sign different from that of the camera shake-correction lens unit.

By doing so, it is possible to increase the camera shake-correction sensitivity. That is, it is possible to reduce the amount of shift of the camera shake-correction lens unit. As a result, it is possible to correct a shift of the imaging position due to camera shake at high speed.

In the telephoto lens of the present embodiment, it is preferable that the third lens unit has an object-side sub-lens unit and an image-side sub-lens unit on the object side and the image side, respectively, and the object-side sub-lens unit and the image-side sub-lens unit both have a refractive power with a sign different from that of the camera shake-correction lens unit.

By doing so, it is possible to increase the camera shake-correction sensitivity. That is, it is possible to reduce the amount of shift of the camera shake-correction lens unit. As a result, it is possible to correct a shift of the imaging position due to camera shake at high speed.

In the telephoto lens of the present embodiment, it is preferable that the camera shake-correction lens unit at least has a first correction lens, a second correction lens, and a third correction lens, and the first correction lens and the second correction lens have a refractive power with the same sign as the camera shake-correction lens unit, and the third correction lens has a refractive power with a sign different from that of the camera shake-correction lens unit.

The camera shake-correction lens unit moves in a direction vertical to the optical axis. This movement mainly causes variation of spherical aberration, astigmatism, and chromatic aberration of magnification. If the amount of this variation is large, the imaging performance is reduced.

Then, in the telephoto lens of the present embodiment, a refractive power with the same sign as the camera shake-correction lens unit is imparted to the first correction lens and the second correction lens. By doing so, the refractive power of the camera shake-correction lens unit is distributed between the first correction lens and the second correction lens. As a result, the refractive power of the first correction lens and the refractive power of the second correction lens are both reduced. Therefore, it is possible to reduce the amount of variation of spherical aberration and the amount of variation of astigmatism.

Furthermore, a refractive power with a sign different from that of the camera shake-correction lens unit is imparted to the third correction lens. By doing so, it is possible to reduce the amount of variation of chromatic aberration of magnification.

In the telephoto lens of the present embodiment, it is preferable that the camera shake-correction lens unit has a negative refractive power.

The camera shake-correction lens unit moves in a direction vertical to the optical axis. Therefore, the camera shake-correction lens unit preferably has a small diameter. By setting the lens unit positioned where light rays converge more, as the camera shake-correction lens unit, it is possible to reduce the size of the camera shake-correction lens unit. Then, by setting the refractive power of the camera shake-correction lens unit to a negative refractive power, it is possible to further reduce the size of the camera shake-correction lens unit.

In the telephoto lens of the present embodiment, it is preferable that the third lens unit has an object-side sub-lens unit having a positive refractive power, a camera shake-correction lens unit having a negative refractive power, and an image-side sub-lens unit having a positive refractive power.

As described above, in the telephoto lens of the present embodiment, the first lens unit has a positive refractive power and the second lens unit has a negative refractive power. Therefore, since telephoto action can be obtained, it is possible to reduce the overall length of the optical system.

Since the first lens unit has a positive refractive power, light rays converge on the side closer to the image side than the first lens unit. That is, the height of light rays is low at the position of the second lens unit. Therefore, the outer diameter of the second lens unit is reduced. Then, the second lens unit is set as the focus lens unit and focusing is performed in the second lens unit. By doing so, it is possible to reduce the outer diameter of the focus lens unit.

In the focus lens unit, when the refractive power is increased, the focus sensitivity becomes high. When the focus sensitivity is high, the amount of movement of the focus lens unit at the time of focusing is reduced. As described above, the second lens unit functions as the focus lens unit. Then, the refractive power of the second lens unit is increased. By doing so, it is possible to enhance the focus sensitivity. As a result, it is possible to reduce the amount of movement of the focus lens unit at the time of focusing.

A focus unit has a focus lens unit and a focus mechanism. Achieving a smaller diameter of the focus lens unit and reducing the amount of movement at the time of focusing can also reduce the size and weight of the entire focus unit.

Furthermore, light incident on the focus lens unit is converging light. Therefore, even when the refractive power of the focus lens unit is increased, it is possible to reduce divergence of light rays passing through the focus lens unit. As a result, it is possible to reduce the diameter of the entire lens system positioned closer to the image side than the second lens unit while enhancing focus sensitivity.

By arranging a positive lens unit on the image side of the second lens unit, it is possible to easily enhance the focus sensitivity.

The camera shake-correction lens unit moves in a direction vertical to the optical axis. It is preferable to minimize the range of movement of the camera shake-correction lens unit. Based on this, it is desirable that a lens unit positioned where the height of light rays is low be set as the camera shake-correction lens unit.

As described above, on the side closer to the image side than the first lens unit, the height of light rays is low. Thus, it is preferable that the camera shake-correction lens unit be provided in the second lens unit or the third lens unit. However, the second lens unit functions as a focus lens unit. Based on this, it is preferable that the camera shake-correction lens unit be disposed in the third lens unit.

Here, the third lens unit is constituted with an object-side sub-lens unit having a positive refractive power, a camera shake-correction lens unit having a negative refractive power, and an image-side sub-lens unit having a positive refractive power.

In such an arrangement, the lens units having a positive refractive power are disposed on both sides of the camera shake-correction lens unit. Therefore, it is possible to increase the camera shake-correction sensitivity. That is, it is possible to reduce the amount of shift of the camera shake-correction lens unit. As a result, it is possible to correct a shift of the imaging position due to camera shake at high speed.

As described above, on the side closer to the image side than the first lens unit, the height of light rays is low. Then, an arrangement may be such that the second lens unit has a camera shake-correcting function and the third lens unit has the focusing function. However, in such an arrangement, variation of comatic aberration due to camera shake correction is increased by movement of the lens unit at the time of focusing. Thus, such an arrangement is not preferable.

When the focus lens unit has a negative refractive power, it is possible to enhance focus sensitivity by disposing a positive lens unit on the image side of the focus lens unit. Furthermore, when the camera shake-correction lens unit has a negative refractive power, it is possible to enhance camera shake-correction sensitivity by disposing a positive lens unit on the object side of the camera shake-correction lens unit.

The object-side sub-lens unit is positioned between the second lens unit and the camera shake-correction lens unit. The second lens unit has a negative refractive power and functions as a focus lens unit. Then, when the refractive power of the object-side sub-lens unit is set as a positive refractive power, it follows that a positive lens unit is positioned on the image side of the focus lens unit, and therefore it is possible to enhance the focus sensitivity.

Furthermore, the object-side sub-lens unit is positioned on the object side of the camera shake-correction lens unit. It follows that a positive lens unit is positioned on the object side of the camera shake-correction lens unit, and therefore it is possible to enhance the camera shake-correction sensitivity. In this way, by setting the refractive power of the object-side sub-lens unit as a positive refractive power, it is possible to enhance focus sensitivity and camera shake-correction sensitivity at the same time.

It is preferable that the second lens unit and the third lens unit is disposed closer to the image side than the aperture stop. By doing so, it is possible to further reduce the diameters of the focus lens unit and the camera shake-correction lens unit.

At the time of focusing, a lens unit moves along the optical axis. When the lens unit moves, imaging performance tends to be degraded mainly due to variation of spherical aberration and variation of longitudinal chromatic aberration. In order to alleviate degradation of imaging performance, it is necessary to alleviate variation of spherical aberration and variation of longitudinal chromatic aberration. It is then desirable that the second lens unit at least have a positive lens and a negative lens. By doing so, it is possible to prevent degradation of imaging performance at the time of focusing.

Variation of spherical aberration and variation of longitudinal chromatic aberration in the second lens unit change through the object-side sub-lens unit. Therefore, it is desirable that the object-side sub-lens unit have a positive lens and a negative lens. By doing so, it is possible to reduce variation of spherical aberration and variation of longitudinal chromatic aberration.

At the time of camera shake correction, the lens unit moves in a direction vertical to the optical axis. When the lens unit moves, imaging performance tends to be degraded mainly due to variation of spherical aberration, variation of curvature of field, and variation of chromatic aberration of magnification. In order to alleviate degradation of imaging performance, it is necessary to alleviate variation of spherical aberration, variation of curvature of field, and variation of chromatic aberration of magnification. It is then desirable that the camera shake-correction lens unit at least have one positive lens and two negative lenses. By providing two negative lenses, it is possible to distribute the refractive power of the camera shake-correction lens unit between the two negative lenses. As a result, it is possible to prevent degradation of imaging performance at the time of camera shake correction.

It is desirable that the second lens unit include two lenses, that the object-side sub-lens unit include two or less lenses, and that the camera shake-correction lens unit include three lenses. By doing so, it is possible to construct an optical system having high focusing performance and high camera shake-correcting function with a smaller number of lenses.

In the telephoto lens of the present embodiment, it is preferable that following Conditional Expression (13) is satisfied:

$$1.0 < |MGISB \times (MGIS-1)| < 4.0 \qquad (13),$$

where,

MGISB is a lateral magnification of a second rear-side lens system;

MGIS is a lateral magnification of the camera shake-correction lens unit;

the lateral magnification is the lateral magnification at the time of focusing on an infinite object; and the second rear-side lens system is a lens system constituted with all of the lenses positioned closer to the image side than the camera shake-correction lens unit.

When falling below a lower limit value of Conditional Expression (13), a sufficient camera shake-correction effect cannot be obtained. When exceeding an upper limit value of Conditional Expression (13), the refractive power of the camera shake-correction lens unit is increased. In this case, variation of spherical aberration, variation of curvature of field, and variation of chromatic aberration of magnification are increased. Therefore, it becomes difficult to correct spherical aberration, astigmatism, and chromatic aberration of magnification.

It is preferable that following Conditional Expression (13-1) or (13-2) is satisfied instead of Conditional Expression (13):

$$1.3 < |MGISB \times (MGIS-1)| < 3.0 \quad (13\text{-}1), \text{ and}$$

$$1.5 < |MGISB \times (MGIS-1)| < 2.7 \quad (13\text{-}2).$$

In the telephoto lens of the present embodiment, it is preferable that the aperture stop is disposed between the first lens unit and the second lens unit.

Since the first lens unit has a positive refractive power, a strong convergence action occurs in the first lens unit. Then, the aperture stop is disposed on the object side of the first lens unit, and the second lens unit is disposed on the image side of the aperture stop. By doing so, it is possible to reduce the diameter of the second lens unit. Furthermore, since the second lens unit is a focus lens unit, it is possible to form a very compact focus lens unit.

In the telephoto lens of the present embodiment, it is preferable that the third lens unit has a space in which an optical filter can be disposed.

In optical systems for photography, various optical filters Such as UV cut filters and polarizing filters are used with the optical systems. An optical filter is generally attached closest to the object of the optical system. However, in a telephoto lens having a long focal length, the aperture is largest on the side closest to the object of the optical system. In this case, an optical filter having a large aperture is to be attached, resulting in inconvenience in handling of the optical filter. In such a case, in general, a space for inserting an optical filter is allocated closest to the image of the optical system.

However, in addition to the optical filter, for example, a teleconverter may be attached on the side closest to the image of the optical system. Considering the attachment of an optical filter and the attachment of a teleconverter, it is necessary to make the back focus of the optical system long to some degree. A change in back focus of the optical system has a significant effect on imaging performance and the overall length of the optical system. Therefore, it becomes difficult to reduce the size of the optical system.

Based on this, it is preferable that the telephoto lens be configured such that an optical filter can be disposed in the optical system. Then, in the telephoto lens of the present embodiment, a space where an optical filter can be disposed is allocated in the third lens unit. By doing so, it is possible to reduce the size of the optical filter while preventing degradation of imaging performance. Furthermore, because of the size reduction of the optical filter, it becomes easy to handle the optical filter.

When the third lens unit is constituted with a plurality of sub-lens units, the optical filter is preferably disposed, in particular, between two sub-lens units having a positive refractive power. By doing so, it is possible to reduce variation of the angle of light ray incident on the optical filter. As a result, it is possible to reduce the effects on degradation of imaging performance.

In the first lens unit, basic aberrations, for example, spherical aberration and chromatic aberration are mainly corrected. Therefore, disposing an optical filter in the first lens unit has a significant effect on imaging performance. Meanwhile, the first lens unit is positioned on the object side. Therefore, when compared with the light flux diameter in the other lens units, the light flux diameter in the first lens unit is large. Thus, when an optical filter is disposed in the first lens unit, it is yet difficult to reduce the diameter of the optical filter. In this way, there are few merits in arranging an optical filter in the first lens unit.

Furthermore, the second lens unit moves at the time of focusing in a range from the image-side surface of the first lens unit to the object-side surface of the third lens unit. Therefore, if an optical filter is disposed in this range, the range of movement of the second lens unit may be limited. Thus, it is not preferable to dispose an optical filter in the place where the second lens unit moves.

In the telephoto lens of the present embodiment, it is preferable that following Conditional Expression (14) is satisfied:

$$0.19 \leq DGF\text{airmax}/DGF \leq 1.0 \quad (14),$$

where,

DGFairmax is the largest axial air space, of axial air spaces in the front-side lens unit; and DGF is the axial thickness of the front-side lens unit.

The technical meaning of Conditional Expression (14) has already been described and the description thereof is omitted here.

In the telephoto lens of the present embodiment, it is preferable that following Conditional Expression (15A) is satisfied:

$$0.05 \leq DGFGR/fGF \leq 0.4 \quad (15A),$$

where,

DGFGR is the axial air space between the front-side lens unit and the rear-side lens unit; and fGF is the focal length of the front-side lens unit.

When falling below a lower limit value of Conditional Expression (15A), the light flux-converging action in the front-side lens unit becomes weak. In this case, the outer diameter in the rear-side lens unit is increased. Therefore, it becomes difficult to reduce the size and weight of the first lens unit.

When exceeding an upper limit value of Conditional Expression (15A), the amount of spherical aberration in the front-side lens unit is increased. Therefore, it becomes difficult to correct spherical aberration favorably with the lenses positioned closer to the image side than the front-side lens unit.

It is preferable that following Conditional Expression (15A-1) or (15A-2) is satisfied instead of Conditional Expression (15A):

$$0.06 \leq DGFGR/fGF \leq 0.35 \quad (15\text{A-}1), \text{ and}$$

$$0.08 \leq DGFGR/fGF \leq 0.33 \quad (15\text{A-}2).$$

In the telephoto lens of the present embodiment, it is preferable that following Conditional Expression (15B) is satisfied:

$$0.05 \leq DGFGR1/fGF \leq 0.4 \quad (15B),$$

where,

DGFGR1 is an axial air space between the front-side lens unit and the first rear-side lens unit; and fGF is the focal length of the front-side lens unit.

The technical meaning of Conditional Expression (15B) is the same as the technical meaning of Conditional Expression (15A).

It is preferable that following Conditional Expression (15B-1) or (15B-2) is satisfied instead of Conditional Expression (15B):

$$0.06 \leq DGFGR1/fGF \leq 0.35 \quad (15B-1), \text{ and}$$

$$0.08 \leq DGFGR1/fGF \leq 0.33 \quad (15B-2).$$

In the telephoto lens of the present embodiment, it is preferable that following Conditional Expression (16) is satisfied:

$$50 \leq vdLp1 \quad (16),$$

where, vdLp1 is the Abbe number of a positive lens positioned closest to the object.

The technical meaning of Conditional Expression (16) has already been described and the description is omitted here.

In the telephoto lens of the present embodiment, it is preferable that the front-side lens unit includes two positive lenses.

By doing so, it is becomes easy to reduce the amount of spherical aberration in the front-side lens unit, to reduce the weight of the optical system, and to reduce the overall length of the optical system.

In the telephoto lens of the present embodiment, it is preferable that the first rear-side lens unit have at least two negative lenses.

In the front-side lens unit, a negative lens having a large refractive power is not disposed. Therefore, it is difficult to correct chromatic aberration favorably in the front-side lens unit. Accordingly, in the first rear-side lens unit, it is necessary to enhance the function of correcting spherical aberration and longitudinal chromatic aberration remaining in the front-side lens unit. Then, by using at least two negative lenses in the first rear-side lens unit, it is possible to correct both spherical aberration and longitudinal chromatic aberration favorably while reducing the overall length of the optical system.

In the telephoto lens of the present embodiment, it is preferable that following Conditional Expression (17) is satisfied:

$$1.5 \leq |fG1/fG2| \leq 6.5 \quad (17),$$

where, fG1 is a focal length of the first lens unit; and fG2 is the focal length of the second lens unit.

When falling below a lower limit value of Conditional Expression (17), the amount of spherical aberration in the first lens unit is increased. Therefore, favorable imaging performance cannot be obtained. When exceeding an upper limit value of Conditional Expression (17), focus sensitivity is reduced. In this case, the amount of movement of the second lens unit at the time of focusing is increased. Therefore, the overall length of the optical system is increased.

It is preferable that following Conditional Expression (17-1) or (17-2) is satisfied instead of Conditional Expression (17):

$$2.0 \leq |fG1/fG2| \leq 6.0 \quad (17-1), \text{ and}$$

$$2.2 \leq |fG1/fG2| \leq 5.0 \quad (17-2).$$

In the telephoto lens of the present embodiment, it is preferable that only the second lens unit moves in the optical axis direction.

An image pickup apparatus of the present embodiment includes an optical system and an image pickup element having an image plane and converting an image formed on the image plane by the optical system to an electrical signal, and the optical system is the telephoto lens of the present embodiment.

It is possible to provide an image pickup apparatus having excellent portability and producing a high-quality image.

Examples of the telephoto lens will be described in details below based on the drawings. It is noted that the present invention is not limited by those Examples. Although a thin resin layer formed on the surface of a lens may not be a lens, the thin resin layer is illustrated as a lens in the description of Example 6, for the sake of convenience.

Lens cross-sectional views of Examples will be described.

FIG. 1A, FIG. 2A, FIG. 3A, FIG. 4A, FIG. 5A, FIG. 6A, FIG. 7A, FIG. 8A, and FIG. 9A illustrate lens cross-sectional views at the time of focusing on an infinite object.

FIG. 1B, FIG. 2B, FIG. 3B, FIG. 4B, FIG. 5B, FIG. 6B, FIG. 7B, FIG. 8B, and FIG. 9B illustrate lens cross-sectional views at the time of focusing on a close object.

Aberration diagrams of Examples will be described.

FIG. 10A, FIG. 11A, FIG. 12A, FIG. 13A, FIG. 14A, FIG. 15A, FIG. 16A, FIG. 17A, and FIG. 18A illustrate spherical aberration (SA) at the time of focusing on an infinite object.

FIG. 10B, FIG. 11B, FIG. 12B, FIG. 13B, FIG. 14B, FIG. 15B, FIG. 16B, FIG. 17B, and FIG. 18B illustrate astigmatism (AS) at the time of focusing on an infinite object.

FIG. 10C, FIG. 11C, FIG. 12C, FIG. 13C, FIG. 14C, FIG. 15C, FIG. 16C, FIG. 17C, and FIG. 18C illustrate distortion (DT) at the time of focusing on an infinite object.

FIG. 10D, FIG. 11D, FIG. 12D, FIG. 13D, FIG. 14D, FIG. 15D, FIG. 16D, FIG. 17D, and FIG. 18D illustrate chromatic aberration of magnification (CC) at the time of focusing on an infinite object.

FIG. 10E, FIG. 11E, FIG. 12E, FIG. 13E, FIG. 14E, FIG. 15E, FIG. 16E, FIG. 17E, and FIG. 18E illustrate spherical aberration (SA) at the time of focusing on a close object.

FIG. 10F, FIG. 11F, FIG. 12F, FIG. 13F, FIG. 14F, FIG. 15F, FIG. 16F, FIG. 17J, and FIG. 18F illustrate astigmatism (AS) at the time of focusing on a close object focusing.

FIG. 10G, FIG. 11G, FIG. 12G, FIG. 13G, FIG. 14G, FIG. 15G, FIG. 16G, FIG. 17G, and FIG. 18G illustrate distortion (DT) at the time of focusing on a close object focusing.

FIG. 10H, FIG. 11H, FIG. 12H, FIG. 13H, FIG. 14H, FIG. 15H, FIG. 16H, FIG. 17H, and FIG. 18H illustrate chromatic aberration of magnification (CC) at the time of focusing on a close object focusing.

A telephoto lens of Example 1 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, a biconvex positive lens L7, and a negative meniscus lens L8 having a convex surface facing the image side.

Here, the negative meniscus lens L3 and the positive meniscus lens L4 are cemented together. The biconvex positive lens L5 and the biconcave negative lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing the object side, a biconvex positive lens L12, a biconvex positive lens L13, a biconcave negative lens L14, a biconcave negative lens L15, a biconvex positive lens L16, a negative meniscus lens L17 having a convex surface facing the image side, a biconvex positive lens L18, and a negative meniscus lens L19 having a convex surface facing the image side.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the negative meniscus lens L19 are cemented together.

An object-side sub-lens unit includes the negative meniscus lens L11 and the biconvex positive lens L12. A camera shake-correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the negative meniscus lens L19.

At a time of focusing from an infinite object to a close object, the second lens unit G2 moves toward the image side. At a time of camera shake correction, the camera shake-correction lens unit moves in a direction vertical to the optical axis.

A telephoto lens of Example 2 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, and a biconvex positive lens L7.

Here, the negative meniscus lens L3 and the positive meniscus lens L4 are cemented together. The biconvex positive lens L5 and the biconcave negative lens L6 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7.

The second lens unit G2 includes a biconvex positive lens L8 and a biconcave negative lens L9. Here, the biconvex positive lens L8 and the biconcave negative lens L9 are cemented together.

The third lens unit G3 includes a negative meniscus lens L10 having a convex surface facing the object side, a biconvex positive lens L11, a biconvex positive lens L12, a biconcave negative lens L13, a biconcave negative lens L14, a biconvex positive lens L15, a negative meniscus lens L16 having a convex surface facing the image side, a biconvex positive lens L17, and a negative meniscus lens L18 having a convex surface facing the image side.

Here, the negative meniscus lens L10 and the biconvex positive lens L11 are cemented together. The biconvex positive lens L12 and the biconcave negative lens L13 are cemented together. The biconvex positive lens L15 and the negative meniscus lens L16 are cemented together. The biconvex positive lens L17 and the negative meniscus lens L18 are cemented together.

An object-side sub-lens unit includes the negative meniscus lens L10 and the biconvex positive lens L11. A camera shake-correction lens unit includes the biconvex positive lens L12, the biconcave negative lens L13, and the biconcave negative lens L14. An image-side sub-lens unit includes the biconvex positive lens L15, the negative meniscus lens L16, the biconvex positive lens L17, and the negative meniscus lens L18.

At a time of focusing from an infinite object to a close object, the second lens unit G2 moves toward the image side. At a time of camera shake correction, the camera shake-correction lens unit moves in a direction vertical to the optical axis.

A telephoto lens of Example 3 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, a biconvex positive lens L7, and a negative meniscus lens L8 having a convex surface facing the image side.

Here, the negative meniscus lens L3 and the positive meniscus lens L4 are cemented together. The biconvex positive lens L5 and the biconcave negative lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a biconvex positive lens L11, a biconvex positive lens L12, a biconcave negative lens L13, a biconcave negative lens L14, a biconvex positive lens L15, a negative meniscus lens L16 having a convex surface facing the image side, a biconvex positive lens L17, and a negative meniscus lens L18 having a convex surface facing the image side.

Here, the biconvex positive lens L12 and the biconcave negative lens L13 are cemented together. The biconvex positive lens L15 and the negative meniscus lens L16 are cemented together. The biconvex positive lens L17 and the negative meniscus lens L18 are cemented together.

An object-side sub-lens unit includes the biconvex positive lens L11. A camera shake-correction lens unit includes the biconvex positive lens L12, the biconcave negative lens L13, and the biconcave negative lens L14. An image-side sub-lens unit includes the biconvex positive lens L15, the negative meniscus lens L16, the biconvex positive lens L17, and the negative meniscus lens L18.

At a time of focusing from an infinite object to a close object, the second lens unit G2 moves toward the image side. At a time of camera shake correction, the camera shake-correction lens unit moves in a direction vertical to the optical axis.

A telephoto lens of Example 4 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, a biconvex positive lens L7, and a negative meniscus lens L8 having a convex surface facing the image side.

Here, the negative meniscus lens L3 and the positive meniscus lens L4 are cemented together. The biconvex positive lens L5 and the biconcave negative lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing the object side, a biconvex positive lens L12, a biconvex positive lens L13, a biconcave negative lens L14, a biconcave negative lens L15, a biconvex positive lens L16, a negative meniscus lens L17 having a convex surface facing the image side, a biconvex positive lens L18, and a biconcave negative lens L19.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the biconcave negative lens L19 are cemented together.

An object-side sub-lens unit includes the negative meniscus lens L11 and the biconvex positive lens L12. A camera shake-correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the biconcave negative lens L19.

At a time of focusing from an infinite object to a close object, the second lens unit G2 moves toward the image side. At a time of camera shake correction, the camera shake-correction lens unit moves in a direction vertical to the optical axis.

A telephoto lens of Example 5 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, a biconvex positive lens L7, and a negative meniscus lens L8 having a convex surface facing the image side.

Here, the negative meniscus lens L3 and the positive meniscus lens L4 are cemented together. The biconvex positive lens L5 and the biconcave negative lens L6 are cemented together. The biconvex positive lens L7 and the negative meniscus lens L8 are cemented together.

A front-side lens unit includes the positive meniscus lens L1 and the positive meniscus lens L2. A rear-side lens unit includes a first rear-side lens unit and a second rear-side lens unit. The first rear-side lens unit includes a negative meniscus lens L3, a positive meniscus lens L4, a biconvex positive lens L5, and a biconcave negative lens L6. The second rear-side lens unit includes the biconvex positive lens L7 and the negative meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a biconvex positive lens L11, a biconvex positive lens L12, a biconcave negative lens L13, a biconcave negative lens L14, a biconvex positive lens L15, a negative meniscus lens L16 having a convex surface facing the image side, a biconvex positive lens L17, and a negative meniscus lens L18 having a convex surface facing the image side.

Here, the biconvex positive lens L12 and the biconcave negative lens L13 are cemented together. The biconvex positive lens L15 and the negative meniscus lens L16 are cemented together. The biconvex positive lens L17 and the negative meniscus lens L18 are cemented together.

An object-side sub-lens unit includes the biconvex positive lens L11. A camera shake-correction lens unit includes the biconvex positive lens L12, the biconcave negative lens L13, and the biconcave negative lens L14. An image-side sub-lens unit includes the biconvex positive lens L15, the negative meniscus lens L16, the biconvex positive lens L17, and the negative meniscus lens L18.

At a time of focusing from an infinite object to a close object, the second lens unit G2 moves toward the image side. At a time of camera shake correction, the camera shake-correction lens unit moves in a direction vertical to the optical axis.

A telephoto lens of Example 6 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a negative meniscus lens L4 having a convex surface facing the object side, a positive meniscus lens L5 having a convex surface facing the object side, a biconvex positive lens L6, a biconcave negative lens L7, and a positive meniscus lens L8 having a convex surface facing the object side. The negative meniscus lens L3 is a resin layer with a small thickness.

Here, the positive meniscus lens L2 and the negative meniscus lens L3 are cemented together. The negative meniscus lens L4 and the positive meniscus lens L5 are cemented together. The biconvex positive lens L6 and the biconcave negative lens L7 are cemented together.

A front-side lens unit includes the positive meniscus lens L1, the positive meniscus lens L2, and the negative meniscus lens L3. A rear-side lens unit includes a first rear-side lens unit and a second rear-side lens unit. The first rear-side lens unit includes the negative meniscus lens L4, the positive meniscus lens L5, the biconvex positive lens L6, and the biconcave negative lens L7. The second rear-side lens unit includes the positive meniscus lens L8.

The second lens unit G2 includes a biconvex positive lens L9 and a biconcave negative lens L10. Here, the biconvex positive lens L9 and the biconcave negative lens L10 are cemented together.

The third lens unit G3 includes a negative meniscus lens L11 having a convex surface facing the object side, a biconvex positive lens L12, a biconvex positive lens L13, a biconcave negative lens L14, a biconcave negative lens L15, a biconvex positive lens L16, a negative meniscus lens L17 having a convex surface facing the image side, a biconvex positive lens L18, and a biconcave negative lens L19.

Here, the negative meniscus lens L11 and the biconvex positive lens L12 are cemented together. The biconvex positive lens L13 and the biconcave negative lens L14 are cemented together. The biconvex positive lens L16 and the negative meniscus lens L17 are cemented together. The biconvex positive lens L18 and the biconcave negative lens L19 are cemented together.

An object-side sub-lens unit includes the negative meniscus lens L11 and the biconvex positive lens L12. A camera shake-correction lens unit includes the biconvex positive lens L13, the biconcave negative lens L14, and the biconcave negative lens L15. An image-side sub-lens unit includes the biconvex positive lens L16, the negative meniscus lens L17, the biconvex positive lens L18, and the biconcave negative lens L19.

At a time of focusing from an infinite object to a close object, the second lens unit G2 moves toward the image side. At a time of camera shake correction, the camera shake-correction lens unit moves in a direction vertical to the optical axis.

An aspheric surface is provided on the image-side surface of the negative meniscus lens L3.

A telephoto lens of Example 7 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, and a biconvex positive lens L7.

Here, the negative meniscus lens L3 and the positive meniscus lens L4 are cemented together. The biconvex positive lens L5 and the biconcave negative lens L6 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7.

The second lens unit G2 includes a positive meniscus lens L8 having a convex surface facing the image side and a biconcave negative lens L9.

The third lens unit G3 includes a negative meniscus lens L10 having a convex surface facing the object side, a biconvex positive lens L11, a biconvex positive lens L12, a biconcave negative lens L13, a biconcave negative lens L14, a biconvex positive lens L15, a negative meniscus lens L16 having a convex surface facing the image side, a biconvex positive lens L17, and a negative meniscus lens L18 having a convex surface facing the image side.

Here, the negative meniscus lens L10 and the biconvex positive lens L11 are cemented together. The biconvex positive lens L12 and the biconcave negative lens L13 are cemented together. The biconvex positive lens L15 and the negative meniscus lens L16 are cemented together. The biconvex positive lens L17 and the negative meniscus lens L18 are cemented together.

An object-side sub-lens unit includes the negative meniscus lens L10 and the biconvex positive lens L11. A camera shake-correction lens unit includes the biconvex positive lens L12, the biconcave negative lens L13, and the biconcave negative lens L14. An image-side sub-lens unit includes the biconvex positive lens L15, the negative meniscus lens L16, the biconvex positive lens L17, and the negative meniscus lens L18.

At a time of focusing from an infinite object to a close object, the second lens unit G2 moves toward the image side. At a time of camera shake correction, the camera shake-correction lens unit moves in a direction vertical to the optical axis.

An aspheric surface is provided on the image-side surface of the biconcave negative lens L9.

A telephoto lens of Example 8 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, and a biconvex positive lens L7.

Here, the negative meniscus lens L3 and the positive meniscus lens L4 are cemented together. The biconvex positive lens L5 and the biconcave negative lens L6 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7.

The second lens unit G2 includes a positive meniscus lens L8 having a convex surface facing the image side and a biconcave negative lens L9, The third lens unit G3 includes a negative meniscus lens L10 having a convex surface facing the object side, a biconvex positive lens L11, a biconvex positive lens L12, a biconcave negative lens L13, a biconcave negative lens L14, a biconvex positive lens L15, a negative meniscus lens L16 having a convex surface facing the image side, a biconvex positive lens L17, and a negative meniscus lens L18 having a convex surface facing the image side.

Here, the negative meniscus lens L10 and the biconvex positive lens L11 are cemented together. The biconvex positive lens L12 and the biconcave negative lens L13 are cemented together. The biconvex positive lens L15 and the negative meniscus lens L16 are cemented together. The biconvex positive lens L17 and the negative meniscus lens L18 are cemented together.

An object-side sub-lens unit includes the negative meniscus lens L10 and the biconvex positive lens L11. A camera shake-correction lens unit includes the biconvex positive lens L12, the biconcave negative lens L13, and the biconcave negative lens L14. An image-side sub-lens unit includes the biconvex positive lens L15, the negative meniscus lens L16, the biconvex positive lens L17, and the negative meniscus lens L18.

At a time of focusing from an infinite object to a close object, the second lens unit G2 moves toward the image side. At a time of camera shake correction, the camera shake-correction lens unit moves in a direction vertical to the optical axis.

An aspheric surface is provided on the image-side surface of the biconcave negative lens L9.

A telephoto lens of Example 9 includes, in order from the object side, a first lens unit G1 having a positive refractive power, a second lens unit G2 having a negative refractive power, and a third lens unit G3 having a positive refractive power. An aperture stop S is disposed between the first lens unit G1 and the second lens unit G2.

The first lens unit G1 includes a positive meniscus lens L1 having a convex surface facing the object side, a positive meniscus lens L2 having a convex surface facing the object side, a negative meniscus lens L3 having a convex surface facing the object side, a positive meniscus lens L4 having a convex surface facing the object side, a biconvex positive lens L5, a biconcave negative lens L6, and a biconvex positive lens L7.

Here, the negative meniscus lens L3 and the positive meniscus lens L4 are cemented together. The biconvex positive lens L5 and the biconcave negative lens L6 are cemented together.

A front-side lens unit includes the positive meniscus lens L1 and the positive meniscus lens L2. A rear-side lens unit includes a first rear-side lens unit and a second rear-side lens unit. The first rear-side lens unit includes the negative meniscus lens L3, the positive meniscus lens L4, the biconvex positive lens L5, and the biconcave negative lens L6. The second rear-side lens unit includes the biconvex positive lens L7.

The second lens unit G2 includes a positive meniscus lens L8 having a convex surface facing the image side and a biconcave negative lens L9. Here, the positive meniscus lens L8 and the biconcave negative lens L9 are cemented together.

The third lens unit G3 includes a negative meniscus lens L10 having a convex surface facing the object side, a biconvex positive lens L11, a biconvex positive lens L12, a biconcave negative lens L13, a biconcave negative lens L14, a biconvex positive lens L15, a negative meniscus lens L16 having a convex surface facing the image side, a biconvex positive lens L17, and a negative meniscus lens L18 having a convex surface facing the image side.

Here, the negative meniscus lens L10 and the biconvex positive lens L11 are cemented together. The biconvex positive lens L12 and the biconcave negative lens L13 are cemented together. The biconvex positive lens L15 and the negative meniscus lens L16 are cemented together. The biconvex positive lens L17 and the negative meniscus lens L18 are cemented together.

An object-side sub-lens unit includes the negative meniscus lens L10 and the biconvex positive lens L11. A camera shake-correction lens unit includes the biconvex positive lens L12, the biconcave negative lens L13, and the biconcave negative lens L14. An image-side sub-lens unit includes the biconvex positive lens L15, the negative meniscus lens L16, the biconvex positive lens L17, and the negative meniscus lens L18.

At a time of focusing from an infinite object to a close object, the second lens unit G2 moves toward the image side. At a time of camera shake correction, the camera shake-correction lens unit moves in a direction vertical to the optical axis.

An aspheric surface is provided on the object-side surface of the positive meniscus lens L8.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and *denotes an aspheric surface.

Further, in Various data, OB denotes a object distance, f denotes a focal length of the entire system, FNO. denotes an F number, ω a half angle of view, LTL denotes a lens total length of the optical system, BF denotes a back focus. Back focus is a unit which is expressed upon air conversion of a distance from a rearmost lens surface to a paraxial image surface. The lens total length is a distance from a frontmost lens surface to the rearmost lens surface plus back focus. Infinite denotes at the time of focusing on an infinite object, Close denotes at the time of focusing on a close object. Unit of OB is mm.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12 . . .

$$Z = (y^2/r)/\left[1 + \{1 - (1+k)(y/r)^2\}^{1/2}\right] + A4y^4 + A6y^6 + A8y^8 + A10y^{10} + A12y^{12} + \ldots$$

Further, in the aspherical surface coefficients, 'e-n' (where, n is an integral number) indicates '$10^{-n}$'. Moreover, these symbols are commonly used in the following numerical data for each example.

EXAMPLE 1

Unit mm

Surface data

| Surface no. | r | d | nd | vd |
|---|---|---|---|---|
| Object plane | ∞ | ∞ | | |
| 1 | 156.832 | 12.000 | 1.48749 | 70.23 |
| 2 | 975.891 | 14.000 | | |
| 3 | 76.441 | 14.000 | 1.43875 | 94.66 |
| 4 | 225.601 | 30.254 | | |
| 5 | 137.293 | 3.200 | 1.80400 | 46.58 |
| 6 | 46.986 | 14.500 | 1.43875 | 94.66 |
| 7 | 584.139 | 0.819 | | |
| 8 | 73.885 | 11.500 | 1.43875 | 94.66 |
| 9 | -193.290 | 2.800 | 1.69680 | 55.53 |
| 10 | 131.732 | 30.161 | | |
| 11 | 170.200 | 6.342 | 1.69895 | 30.13 |
| 12 | -126.703 | 1.772 | 1.91082 | 35.25 |
| 13 | -2889.433 | 3.000 | | |
| 14(Stop) | ∞ | Variable | | |
| 15 | 359.250 | 2.100 | 1.80810 | 22.76 |
| 16 | -120.790 | 0.850 | 1.74320 | 49.34 |
| 17 | 33.468 | Variable | | |
| 18 | 32.651 | 1.000 | 1.92286 | 20.88 |
| 19 | 25.167 | 5.000 | 1.48749 | 70.23 |
| 20 | -105.351 | 3.600 | | |
| 21 | 100.678 | 3.000 | 1.80810 | 22.76 |
| 22 | -47.455 | 0.900 | 1.73400 | 51.47 |
| 23 | 20.878 | 4.279 | | |
| 24 | -33.846 | 0.900 | 1.71300 | 53.87 |
| 25 | 107.524 | 3.267 | | |
| 26 | 45.267 | 6.700 | 1.60342 | 38.03 |
| 27 | -32.937 | 2.200 | 1.92286 | 20.88 |
| 28 | -56.485 | 0.200 | | |
| 29 | 62.735 | 7.500 | 1.73800 | 32.26 |
| 30 | -28.328 | 2.300 | 1.92286 | 20.88 |
| 31 | -84.120 | | | |
| Image plane | ∞ | | | |

Various data

| Telephoto ratio | 0.685 |
|---|---|
| 2ω | 3.2 |
| LTL | 268.519 |
| BF | 32.975 |

| | Infinite | Close |
|---|---|---|
| OB | ∞ | 2.0 |
| f | 391.988 | 297.631 |
| FNO. | 4.080 | 3.077 |
| d14 | 19.000 | 40.150 |
| d17 | 28.400 | 7.250 |

EXAMPLE 2

Unit mm

Surface data

| Surface no. | r | d | nd | vd |
|---|---|---|---|---|
| Object plane | ∞ | ∞ | | |
| 1 | 150.727 | 10.500 | 1.48749 | 70.23 |
| 2 | 651.737 | 15.541 | | |
| 3 | 71.134 | 16.724 | 1.43875 | 94.66 |
| 4 | 362.718 | 26.420 | | |
| 5 | 158.408 | 3.200 | 1.69680 | 55.53 |
| 6 | 41.400 | 14.500 | 1.43875 | 94.66 |
| 7 | 414.878 | 1.116 | | |
| 8 | 61.312 | 11.500 | 1.43875 | 94.66 |
| 9 | -114.766 | 3.000 | 1.77250 | 49.60 |
| 10 | 72.164 | 30.845 | | |
| 11 | 89.837 | 7.000 | 1.60342 | 38.03 |
| 12 | -1077.583 | 3.500 | | |
| 13(Stop) | ∞ | Variable | | |
| 14 | 379.994 | 2.100 | 1.80810 | 22.76 |
| 15 | -187.856 | 0.800 | 1.71300 | 53.87 |
| 16 | 31.756 | Variable | | |
| 17 | 29.444 | 1.000 | 1.92119 | 23.96 |
| 18 | 23.133 | 5.053 | 1.48749 | 70.23 |
| 19 | -127.088 | 3.600 | | |
| 20 | 188.909 | 3.000 | 1.85478 | 24.80 |
| 21 | -42.257 | 0.900 | 1.69680 | 55.53 |
| 22 | 20.229 | 4.624 | | |
| 23 | -30.088 | 0.900 | 1.69680 | 55.53 |
| 24 | 172.684 | 3.300 | | |
| 25 | 45.787 | 6.751 | 1.62004 | 36.26 |
| 26 | -30.959 | 2.500 | 1.92286 | 20.88 |
| 27 | -45.012 | 0.100 | | |
| 28 | 64.530 | 7.523 | 1.61293 | 37.00 |
| 29 | -27.877 | 2.500 | 1.92286 | 20.88 |
| 30 | -70.103 | | | |
| Image plane | ∞ | | | |

Various data

| Telephoto Ratio | 0.685 |
|---|---|
| 2ω | 3.2 |
| LTL | 268.485 |
| BF | 31.630 |

| | Infinite | Close |
|---|---|---|
| OB | ∞ | 2.0 |
| f | 392.007 | 300.467 |
| FNO. | 4.070 | 3.097 |
| d13 | 20.400 | 41.098 |
| d16 | 27.948 | 7.250 |

EXAMPLE 3

Unit mm

Surface data

| Surface no. | r | d | nd | vd |
|---|---|---|---|---|
| Object plane | ∞ | ∞ | | |
| 1 | 264.623 | 11.100 | 1.48749 | 70.23 |
| 2 | 20014.598 | 47.691 | | |
| 3 | 81.993 | 13.000 | 1.43875 | 94.66 |
| 4 | 311.789 | 44.610 | | |
| 5 | 184.543 | 3.200 | 1.78800 | 47.37 |
| 6 | 50.778 | 10.600 | 1.43875 | 94.66 |
| 7 | 294.443 | 1.286 | | |
| 8 | 93.447 | 9.800 | 1.43875 | 94.66 |
| 9 | -128.595 | 2.900 | 1.75500 | 52.32 |
| 10 | 232.754 | 49.393 | | |
| 11 | 72.189 | 5.800 | 1.56732 | 42.82 |

-continued

| | | Unit mm | | |
|---|---|---|---|---|
| 12 | −80.817 | 2.000 | 1.91082 | 35.25 |
| 13 | −194.303 | 3.000 | | |
| 14(Stop) | ∞ | Variable | | |
| 15 | 657.445 | 2.079 | 1.80810 | 22.76 |
| 16 | −100.323 | 0.792 | 1.71300 | 53.87 |
| 17 | 30.352 | Variable | | |
| 18 | 33.984 | 5.346 | 1.43875 | 94.66 |
| 19 | −92.054 | 3.871 | | |
| 20 | 369.045 | 2.426 | 1.92286 | 20.88 |
| 21 | −53.903 | 0.891 | 1.61800 | 63.40 |
| 22 | 23.158 | 3.881 | | |
| 23 | −36.330 | 0.891 | 1.69680 | 55.53 |
| 24 | 46.784 | 3.277 | | |
| 25 | 56.274 | 7.960 | 1.74951 | 35.33 |
| 26 | −23.449 | 1.782 | 1.92286 | 20.88 |
| 27 | −79.583 | 0.297 | | |
| 28 | 59.359 | 8.544 | 1.61293 | 37.00 |
| 29 | −27.503 | 2.277 | 1.92286 | 20.88 |
| 30 | −47.248 | | | |
| Image plane | ∞ | | | |

| Various data | |
|---|---|
| Telephoto Ratio | 0.836 |
| 2ω | 3.2 |
| LTL | 327.555 |
| BF | 34.678 |

| | Infinite | Close |
|---|---|---|
| OB | ∞ | 2.5 |
| f | 392.037 | 327.311 |
| FNO. | 4.079 | 3.388 |
| d14 | 20.323 | 35.325 |
| d17 | 23.862 | 8.861 |

EXAMPLE 4

| | | Unit mm | | |
|---|---|---|---|---|
| | | Surface data | | |
| Surface no. | r | d | nd | νd |
| Object plane | ∞ | ∞ | | |
| 1 | 199.588 | 13.500 | 1.48749 | 70.23 |
| 2 | 1212.097 | 35.000 | | |
| 3 | 95.779 | 16.600 | 1.43875 | 94.66 |
| 4 | 343.469 | 21.004 | | |
| 5 | 168.922 | 3.500 | 1.77250 | 49.60 |
| 6 | 63.825 | 16.500 | 1.43875 | 94.66 |
| 7 | 388.340 | 2.155 | | |
| 8 | 116.181 | 13.000 | 1.43875 | 94.66 |
| 9 | −305.996 | 3.000 | 1.69350 | 53.21 |
| 10 | 199.464 | 66.671 | | |
| 11 | 165.749 | 8.000 | 1.67270 | 32.10 |
| 12 | −104.011 | 4.000 | 1.91082 | 35.25 |
| 13 | −6747.942 | 5.650 | | |
| 14 (Stop) | ∞ | Variable | | |
| 15 | 391.800 | 2.200 | 1.80810 | 22.76 |
| 16 | −88.303 | 0.900 | 1.77250 | 49.60 |
| 17 | 37.564 | Variable | | |
| 18 | 34.190 | 1.000 | 1.92286 | 20.88 |
| 19 | 26.923 | 5.000 | 1.48749 | 70.23 |
| 20 | −161.657 | 3.600 | | |
| 21 | 122.039 | 3.100 | 1.80810 | 22.76 |
| 22 | −52.683 | 0.900 | 1.69680 | 55.53 |
| 23 | 22.975 | 4.632 | | |
| 24 | −38.276 | 0.900 | 1.74100 | 52.64 |
| 25 | 196.791 | 3.892 | | |
| 26 | 48.160 | 7.801 | 1.56732 | 42.82 |
| 27 | −22.764 | 2.500 | 1.92286 | 20.88 |
| 28 | −35.997 | 10.300 | | |

-continued

| | | Unit mm | | |
|---|---|---|---|---|
| 29 | 46.777 | 5.900 | 1.73800 | 32.26 |
| 30 | −91.048 | 2.300 | 1.92286 | 20.88 |
| 31 | 167.052 | | | |
| Image plane | ∞ | | | |

| Various data | |
|---|---|
| Telephoto Ratio | 0.691 |
| 2ω | 2.5 |
| LTL | 338.484 |
| BF | 32.939 |

| | Infinite | Close |
|---|---|---|
| OB | ∞ | 3.5 |
| f | 489.999 | 403.980 |
| FNO. | 4.080 | 3.346 |
| d14 | 16.650 | 34.774 |
| d17 | 25.390 | 7.266 |

EXAMPLE 5

| | | Unit mm | | |
|---|---|---|---|---|
| | | Surface data | | |
| Surface no. | r | d | nd | νd |
| Object plane | ∞ | ∞ | | |
| 1 | 215.266 | 11.500 | 1.48749 | 70.23 |
| 2 | 1535.372 | 37.578 | | |
| 3 | 88.716 | 14.158 | 1.43875 | 94.66 |
| 4 | 424.474 | 37.426 | | |
| 5 | 203.983 | 3.546 | 1.75500 | 52.32 |
| 6 | 54.116 | 12.142 | 1.43875 | 94.66 |
| 7 | 324.512 | 4.778 | | |
| 8 | 97.727 | 9.879 | 1.43875 | 94.66 |
| 9 | −150.126 | 2.800 | 1.69680 | 55.53 |
| 10 | 150.668 | 70.467 | | |
| 11 | 78.749 | 6.236 | 1.57099 | 50.80 |
| 12 | −91.000 | 2.000 | 1.88300 | 40.76 |
| 13 | −259.795 | 3.901 | | |
| 14 (Stop) | ∞ | Variable | | |
| 15 | 657.445 | 2.079 | 1.80810 | 22.76 |
| 16 | −100.323 | 0.792 | 1.71300 | 53.87 |
| 17 | 30.352 | Variable | | |
| 18 | 33.984 | 5.346 | 1.43875 | 94.66 |
| 19 | −92.054 | 3.871 | | |
| 20 | 369.045 | 2.426 | 1.92286 | 20.88 |
| 21 | −53.903 | 0.891 | 1.61800 | 63.40 |
| 22 | 23.158 | 3.881 | | |
| 23 | −36.330 | 0.891 | 1.69680 | 55.53 |
| 24 | 46.784 | 3.277 | | |
| 25 | 44.502 | 7.960 | 1.65412 | 39.68 |
| 26 | −27.295 | 1.782 | 1.92286 | 20.88 |
| 27 | −57.477 | 0.297 | | |
| 28 | 52.024 | 8.544 | 1.56732 | 42.82 |
| 29 | −26.618 | 2.277 | 1.92286 | 20.88 |
| 30 | −51.051 | | | |
| Image plane | ∞ | | | |

| Various data | |
|---|---|
| Telephoto Ratio | 0.770 |
| 2ω | 2.8 |
| LTL | 339.313 |
| BF | 34.255 |

| | Infinite | Close |
|---|---|---|
| OB | ∞ | 3.2 |
| f | 440.935 | 368.565 |
| FNO. | 4.279 | 3.559 |

-continued

Unit mm

| | | |
|---|---|---|
| d14 | 20.308 | 35.278 |
| d17 | 23.879 | 8.908 |

EXAMPLE 6

Unit mm

Surface data

| Surface no. | r | d | nd | vd |
|---|---|---|---|---|
| Object plane | ∞ | ∞ | | |
| 1 | 185.654 | 13.000 | 1.48749 | 70.23 |
| 2 | 725.665 | 47.516 | | |
| 3 | 88.300 | 19.000 | 1.45860 | 90.20 |
| 4 | 460.000 | 0.200 | 1.63493 | 23.90 |
| 5* | 425.730 | 25.711 | | |
| 6 | 159.278 | 3.500 | 1.69680 | 55.53 |
| 7 | 52.456 | 16.678 | 1.43875 | 94.66 |
| 8 | 642.788 | 1.115 | | |
| 9 | 75.639 | 14.502 | 1.43875 | 94.66 |
| 10 | −169.631 | 3.000 | 1.77250 | 49.60 |
| 11 | 88.384 | 49.365 | | |
| 12 | 126.793 | 7.012 | 1.66680 | 33.05 |
| 13 | 1509.702 | 7.032 | | |
| 14 (Stop) | ∞ | Variable | | |
| 15 | 272.463 | 2.200 | 1.80810 | 22.76 |
| 16 | −188.242 | 0.900 | 1.77250 | 49.60 |
| 17 | 35.183 | Variable | | |
| 18 | 31.520 | 1.000 | 1.90366 | 31.32 |
| 19 | 21.805 | 5.171 | 1.51633 | 64.14 |
| 20 | −215.706 | 3.600 | | |
| 21 | 208.803 | 3.155 | 1.85478 | 24.80 |
| 22 | −41.327 | 0.900 | 1.69680 | 55.53 |
| 23 | 23.298 | 4.989 | | |
| 24 | −30.877 | 0.900 | 1.69680 | 55.53 |
| 25 | 862.133 | 3.300 | | |
| 26 | 54.469 | 7.881 | 1.60342 | 38.03 |
| 27 | −21.833 | 2.480 | 1.92286 | 20.88 |
| 28 | −32.743 | 10.300 | | |
| 29 | 53.974 | 5.900 | 1.66680 | 33.05 |
| 30 | −60.924 | 2.500 | 1.92286 | 20.88 |
| 31 | 691.964 | | | |
| Image plane | ∞ | | | |

Aspherical surface data
5th surface k = 0.0000
A4 = 1.0000e−010, A6 = −5.0000e−014, A8 = 0.0000e+000,
A10 = 0.0000e+000

Various data

| | | |
|---|---|---|
| Telephoto Ratio | 0.669 | |
| 2ω | 2.5 | |
| LTL | 324.169 | |
| BF | 17.323 | |

| | Infinite | Close |
|---|---|---|
| OB | ∞ | 3.5 |
| f | 484.265 | 392.425 |
| FNO. | 4.066 | 3.275 |
| d14 | 19.000 | 36.586 |
| d17 | 25.039 | 7.453 |

EXAMPLE 7

Unit mm

Surface data

| Surface no. | r | d | nd | vd |
|---|---|---|---|---|
| Object plane | ∞ | ∞ | | |
| 1 | 220.040 | 11.000 | 1.48749 | 70.23 |
| 2 | 999.794 | 47.274 | | |
| 3 | 73.569 | 14.711 | 1.49700 | 81.61 |
| 4 | 335.054 | 23.909 | | |
| 5 | 156.055 | 3.200 | 1.69680 | 55.53 |
| 6 | 43.325 | 14.083 | 1.43700 | 95.10 |
| 7 | 289.382 | 1.115 | | |
| 8 | 74.512 | 12.006 | 1.49700 | 81.61 |
| 9 | −120.520 | 2.800 | 1.77250 | 49.60 |
| 10 | 74.646 | 36.356 | | |
| 11 | 84.036 | 6.051 | 1.58267 | 46.42 |
| 12 | −640.863 | 13.500 | | |
| 13 (Stop) | ∞ | Variable | | |
| 14 | −216.858 | 2.200 | 1.63493 | 23.90 |
| 15 | −61.068 | 0.395 | | |
| 16 | −54.861 | 1.000 | 1.53071 | 55.69 |
| 17* | 29.841 | Variable | | |
| 18 | 28.827 | 1.000 | 1.80810 | 22.76 |
| 19 | 21.247 | 5.809 | 1.48749 | 70.23 |
| 20 | −159.140 | 3.600 | | |
| 21 | 533.374 | 3.600 | 1.80810 | 22.76 |
| 22 | −38.800 | 0.900 | 1.69680 | 55.53 |
| 23 | 29.423 | 3.490 | | |
| 24 | −59.334 | 0.900 | 1.77250 | 49.60 |
| 25 | 73.393 | 3.300 | | |
| 26 | 64.162 | 6.500 | 1.61293 | 37.00 |
| 27 | −36.886 | 2.500 | 1.80810 | 22.76 |
| 28 | −62.001 | 3.663 | | |
| 29 | 52.800 | 9.000 | 1.65412 | 39.68 |
| 30 | −38.248 | 2.500 | 1.80810 | 22.76 |
| 31 | −178.240 | | | |
| Image plane | ∞ | | | |

Aspherical surface data
17th surface k = 0.0000
A4 = −2.3853e−006, A6 = −3.7627e−009, A8 = 1.6575e−012,
A10 = 0.0000e+000

Various data

| | | |
|---|---|---|
| Telephoto Ratio | 0.825 | |
| 2ω | 3.2 | |
| LTL | 323.529 | |
| BF | 39.122 | |

| | Infinite | Close |
|---|---|---|
| OB | ∞ | 2.0 |
| f | 391.993 | 307.247 |
| FNO. | 4.070 | 3.174 |
| d13 | 19.00 | 40.485 |
| d17 | 29.045 | 7.559 |

EXAMPLE 8

Unit mm

Surface data

| Surface no. | r | d | nd | vd |
|---|---|---|---|---|
| Object plane | ∞ | ∞ | | |
| 1 | 207.585 | 13.000 | 1.48749 | 70.23 |

-continued

Unit mm

| | | | | |
|---|---|---|---|---|
| 2 | 1550.011 | 47.000 | | |
| 3 | 83.672 | 19.700 | 1.43875 | 94.66 |
| 4 | 561.585 | 24.340 | | |
| 5 | 215.802 | 3.588 | 1.69680 | 55.53 |
| 6 | 52.249 | 17.000 | 1.43875 | 94.66 |
| 7 | 1149.881 | 1.115 | | |
| 8 | 83.478 | 14.500 | 1.43875 | 94.66 |
| 9 | −135.670 | 2.800 | 1.77250 | 49.60 |
| 10 | 108.163 | 45.091 | | |
| 11 | 201.384 | 7.000 | 1.71736 | 29.52 |
| 12 | −874.411 | 9.753 | | |
| 13 (Stop) | ∞ | Variable | | |
| 14 | −230.408 | 2.200 | 1.63493 | 23.90 |
| 15 | −73.008 | 0.349 | | |
| 16 | −68.280 | 1.000 | 1.53071 | 55.69 |
| 17* | 30.624 | Variable | | |
| 18 | 31.232 | 1.000 | 1.92286 | 20.88 |
| 19 | 25.271 | 5.000 | 1.48749 | 70.23 |
| 20 | −195.708 | 3.600 | | |
| 21 | 86.152 | 3.669 | 1.80810 | 22.76 |
| 22 | −43.751 | 0.900 | 1.74100 | 52.64 |
| 23 | 26.477 | 3.883 | | |
| 24 | −50.133 | 0.900 | 1.83481 | 42.73 |
| 25 | 60.796 | 3.300 | | |
| 26 | 53.028 | 6.700 | 1.68893 | 31.07 |
| 27 | −28.074 | 2.500 | 1.92286 | 20.88 |
| 28 | −64.741 | 3.486 | | |
| 29 | 61.094 | 11.000 | 1.62004 | 36.26 |
| 30 | −30.502 | 2.500 | 1.92286 | 20.88 |
| 31 | −64.979 | | | |
| Image plane | ∞ | | | |

Aspherical surface data
17th surface k = 0.0000
A4 = −1.9239e−006, A6 = −2.5932e−009, A8 = 1.2780e−012,
A10 = 0.0000e+000

Various data

| Telephoto Ratio | 0.691 |
|---|---|
| 2ω | 2.5 |
| LTL | 338.667 |
| BF | 34.582 |

| | Infinite | Close |
|---|---|---|
| OB | ∞ | 3.0 |
| f | 489.990 | 385.385 |
| FNO. | 4.080 | 3.190 |
| d13 | 19.000 | 39.698 |
| d17 | 28.210 | 7.512 |

EXAMPLE 9

Unit mm

Surface data

| Surface no. | r | d | nd | vd |
|---|---|---|---|---|
| Object plane | ∞ | ∞ | | |
| 1 | 207.585 | 13.000 | 1.48749 | 70.23 |
| 2 | 1550.011 | 47.000 | | |
| 3 | 83.672 | 19.700 | 1.43875 | 94.66 |
| 4 | 561.585 | 24.340 | | |
| 5 | 215.802 | 3.588 | 1.69680 | 55.53 |
| 6 | 52.249 | 17.000 | 1.43875 | 94.66 |
| 7 | 1149.881 | 1.116 | | |
| 8 | 83.478 | 14.500 | 1.43875 | 94.66 |
| 9 | −135.670 | 2.800 | 1.77250 | 49.60 |
| 10 | 108.163 | 45.091 | | |

-continued

Unit mm

| | | | | |
|---|---|---|---|---|
| 11 | 201.384 | 7.000 | 1.71736 | 29.52 |
| 12 | −874.411 | 9.753 | | |
| 13 (Stop) | ∞ | Variable | | |
| 14* | −230.408 | 1.000 | 1.63400 | 23.10 |
| 15 | −68.280 | 0.600 | 1.51742 | 52.43 |
| 16 | 30.624 | Variable | | |
| 17 | 31.232 | 1.000 | 1.92286 | 20.88 |
| 18 | 25.271 | 5.000 | 1.49700 | 81.54 |
| 19 | −195.708 | 3.600 | | |
| 20 | 86.152 | 3.669 | 1.80810 | 22.76 |
| 21 | −43.751 | 0.900 | 1.74100 | 52.64 |
| 22 | 26.477 | 3.883 | | |
| 23 | −50.133 | 0.900 | 1.83481 | 42.73 |
| 24 | 60.796 | 3.300 | | |
| 25 | 53.028 | 6.700 | 1.68893 | 31.07 |
| 26 | −28.074 | 2.500 | 1.92286 | 20.88 |
| 27 | −64.741 | 3.486 | | |
| 28 | 59.175 | 11.000 | 1.61293 | 37.00 |
| 29 | −30.502 | 2.500 | 1.92286 | 20.88 |
| 30 | −64.979 | | | |
| Image plane | ∞ | | | |

Aspherical surface data
14th surface k = 0.0000
A4 = 7.5150e−007, A6 = −5.1160e−010, A8 = −1.0000e−012,
A10 = 0.0000e+000

Various data

| Telephoto Ratio | 0.724 |
|---|---|
| 2ω | 2.7 |
| LTL | 333.396 |
| BF | 31.260 |

| | Infinite | Close |
|---|---|---|
| OB | ∞ | 3.0 |
| f | 460.561 | 374.991 |
| FNO. | 3.812 | 3.086 |
| d13 | 19.000 | 40.007 |
| d16 | 28.210 | 7.202 |

The values of the conditional expressions in Examples are listed below. In Examples 1 to 6, no plastic lens is used. However, in the following, the value of Conditional Expression (11) and the value of Conditional Expression (12) are described assuming that a plastic lens is used. The value of Conditional Expression (1B) is the same as the value of Conditional Expression (1A). The value of Conditional Expression (2B) is the same as the value of Conditional Expression (2A). The value of Conditional Expression (15B) is the same as the value of Conditional Expression (15A).

Conditional
Expression

| | Example 1 | Example 2 | Example 3 |
|---|---|---|---|
| (1A) DGFGR/f | 0.077 | 0.067 | 0.114 |
| (1B) DGFGR1/f | | | |
| (2A) ΔGFGR/f | 0.179 | 0.176 | 0.297 |
| (2B) ΔGFGR1/f | | | |
| (3) vdGFave | 82.445 | 82.445 | 82.445 |
| (4) vdGFmax | 94.660 | 94.660 | 94.660 |
| (5) DGR1GR2/f | 0.077 | 0.079 | 0.126 |
| (6) fGF/f | 0.403 | 0.351 | 0.468 |
| (7) fL1/fGF | 2.416 | 2.905 | 2.998 |
| (8) fGF/fGR1 | −0.488 | −1.222 | −0.930 |
| (9) |fG2/f| | 0.132 | 0.129 | 0.120 |
| (10) |MGG2B$^2$ × | 4.700 | 4.701 | 4.716 |

-continued

|  | Example 1 | Example 2 | Example 3 |
|---|---|---|---|
| (MGG22 − 1)| | | | |
| (11) fPLn/fPLp | −0.314 | −0.244 | −0.300 |
| (12) |fG2/fPLp| | 0.461 | 0.325 | 0.436 |
| (13) |MGISB × (MGIS − 1)| | 2.000 | 2.000 | 2.070 |
| (14) DGFairmax/DGF | 0.350 | 0.363 | 0.664 |
| (15A) DGFGR/fGF | 0.192 | 0.192 | 0.243 |
| (15B) DGFGR1/fGF | | | |
| (16) vdLp1 | 70.23 | 70.23 | 70.23 |
| (17) |fG1/fG2| | 3.284 | 3.363 | 3.649 |
| (a) |f/fLn| | 4.342 | 4.819 | 4.363 |

Conditional
Expression

|  | Example 4 | Example 5 | Example 6 |
|---|---|---|---|
| (1A) DGFGR/f | 0.043 | 0.085 | 0.053 |
| (1B) DGFGR1/f | | | |
| (2A) ΔGFGR/f | 0.176 | 0.228 | 0.218 |
| (2B) ΔGFGR1/f | | | |
| (3) vdGFave | 82.445 | 82.445 | 80.215 |
| (4) vdGFmax | 94.660 | 94.660 | 90.200 |
| (5) DGR1GR2/f | 0.136 | 0.160 | 0.102 |
| (6) fGF/f | 0.398 | 0.407 | 0.364 |
| (7) fL1/fGF | 2.505 | 2.855 | 2.881 |
| (8) fGF/fGR1 | −0.955 | −0.425 | −0.976 |
| (9) |fG2/f| | 0.113 | 0.107 | 0.110 |
| (10) |MGG2B² × (MGG22 − 1)| | 4.500 | 4.560 | 4.487 |
| (11) fPLn/fPLp | −0.381 | −0.302 | −0.277 |
| (12) |fG2/fPLp| | 0.621 | 0.436 | 0.388 |
| (13) |MGISB × (MGIS − 1)| | 2.000 | 2.087 | 1.570 |
| (14) DGFairmax/DGF | 0.538 | 0.594 | 0.596 |
| (15A) DGFGR/fGF | 0.108 | 0.209 | 0.146 |
| (15B) DGFGR1/fGF | | | |
| (16) vdLp1 | 70.23 | 70.23 | 70.230 |
| (17) |fG1/fG2| | 3.919 | 4.183 | 3.987 |
| (a) |f/fLn| | 3.636 | 4.474 | 4.256 |

Conditional
Expression

|  | Example 7 | Example 8 | Example 9 |
|---|---|---|---|
| (1A) DGFGR/f | 0.061 | 0.050 | |
| (1B) DGFGR1/f | | | 0.053 |
| (2A) ΔGFGR/f | 0.247 | 0.212 | |
| (2B) ΔGFGR1/f | | | 0.226 |
| (3) vdGFave | 75.920 | 82.445 | 82.445 |
| (4) vdGFmax | 81.610 | 94.660 | 94.660 |
| (5) DGR1GR2/f | 0.093 | 0.092 | 0.098 |
| (6) fGF/f | 0.386 | 0.337 | 0.359 |
| (7) fL1/fGF | 3.804 | 2.967 | 2.967 |
| (8) fGF/fGR1 | −1.305 | −1.016 | −1.016 |
| (9) |fG2/f| | 0.128 | 0.106 | 0.121 |
| (10) |MGG2B² × (MGG22 − 1)| | 4.488 | 4.680 | 4.075 |
| (11) fPLn/fPLp | −0.272 | −0.237 | −0.267 |
| (12) |fG2/fPLp| | 0.376 | 0.311 | 0.364 |
| (13) |MGISB × (MGIS − 1)| | 2.000 | 2.000 | 1.898 |
| (14) DGFairmax/DGF | 0.648 | 0.590 | 0.590 |
| (15A) DGFGR/fGF | 0.158 | 0.147 | |
| (15B) DGFGR1/fGF | | | 0.147 |
| (16) vdLp1 | 70.23 | 70.23 | 70.23 |
| (17) |fG1/fG2| | 3.578 | 4.144 | 3.881 |
| (a) |f/fLn| | 4.501 | 4.908 | 4.613 |

Figure 19:
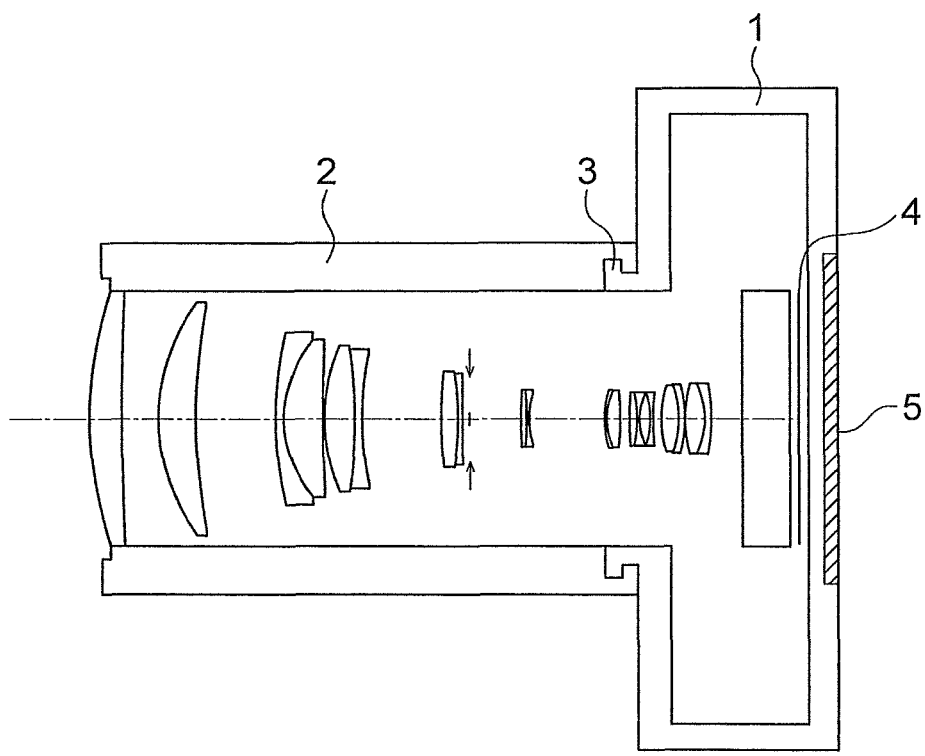
FIG. 19 is a cross-sectional view of an image pickup apparatus.

FIG. 19 is a cross-sectional view of a single-lens mirrorless camera as an electronic image pickup apparatus. In FIG. 19, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the telephoto lens described in any one of the examples from the first example to the nine example is to be used.

Figure 20:
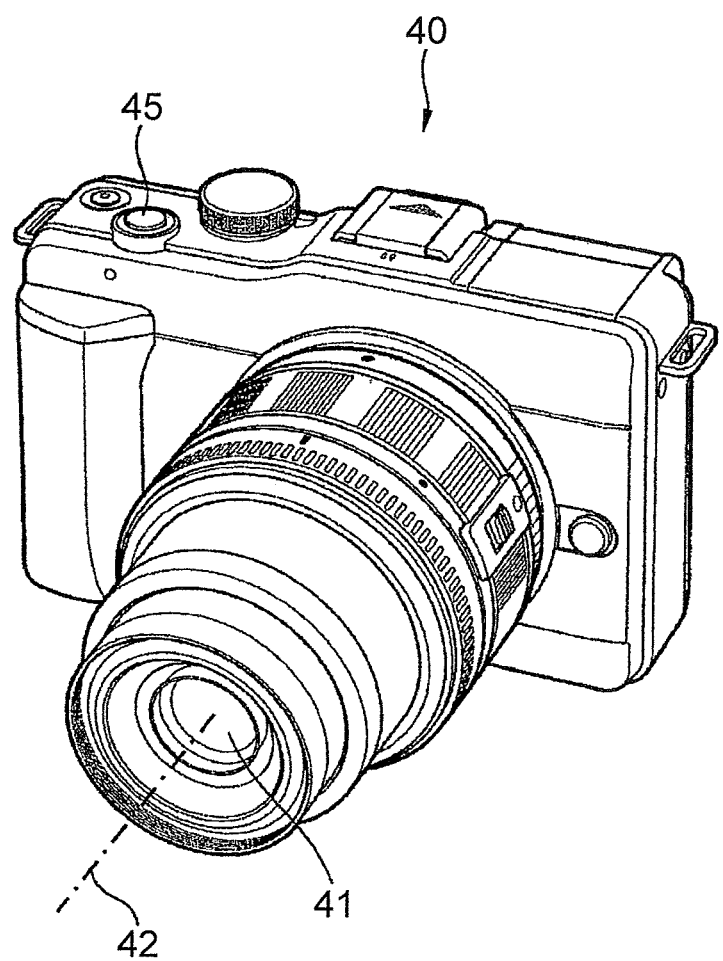
FIG. 20 is a front perspective view of the image pickup apparatus.
Figure 21:
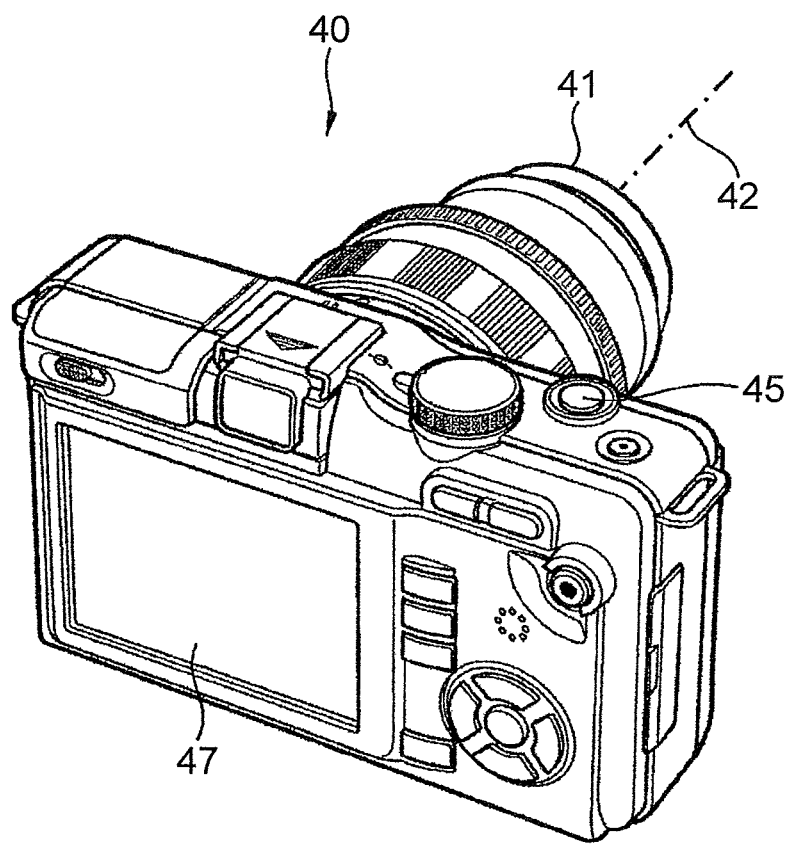
FIG. 21 is a rear perspective view of the image pickup apparatus.

FIG. 20 and FIG. 21 are conceptual diagrams of an arrangement of the image pickup apparatus. FIG. 20 is a front perspective view of a digital camera 40 as the image pickup apparatus, and FIG. 21 is a rear perspective view of the digital camera 40. The telephoto lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the telephoto lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 22:
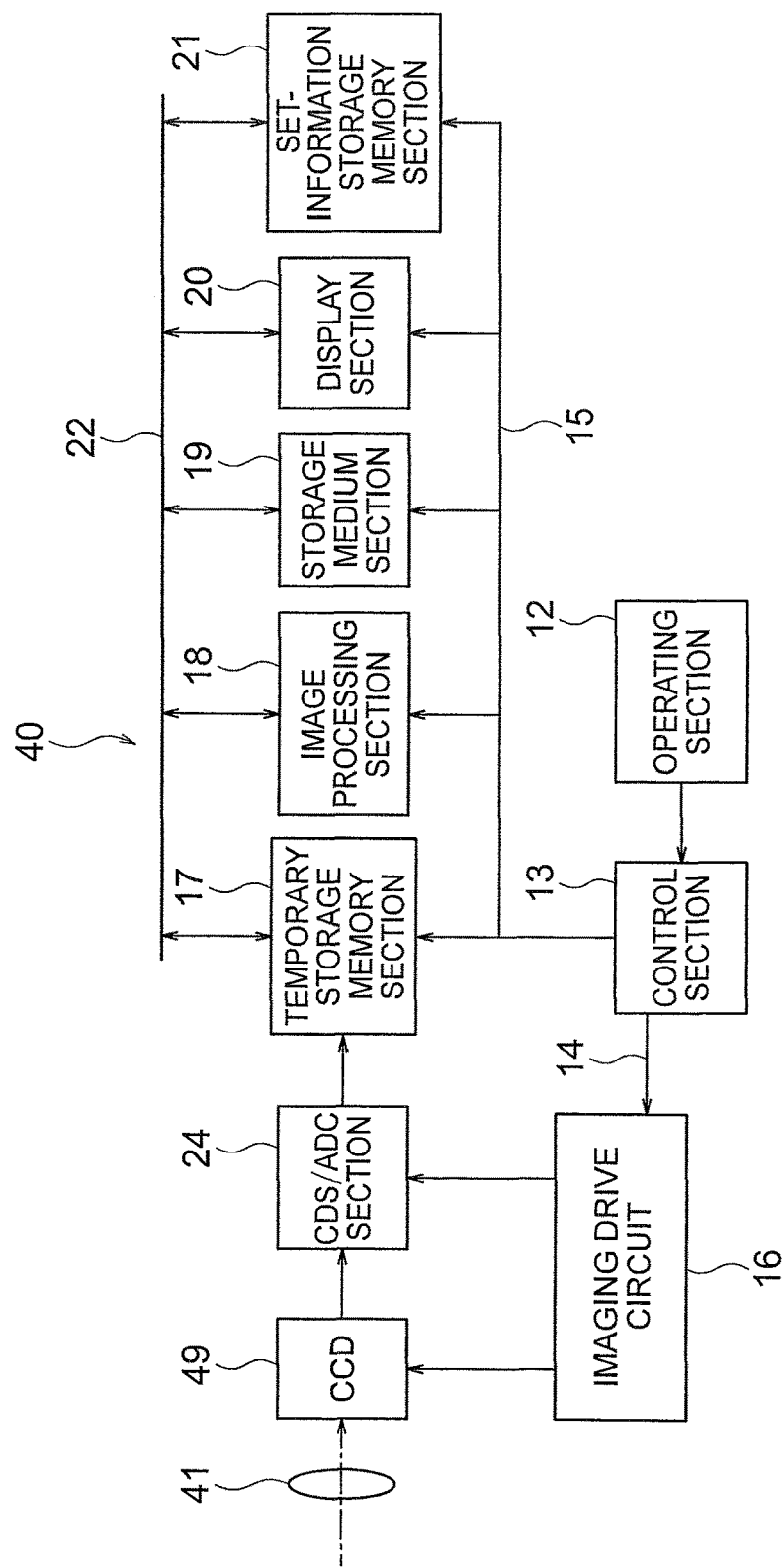
FIG. 22 is a structural block diagram showing an internal circuit of main components of the image pickup apparatus.

FIG. 22 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 22, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The present invention can have various modified examples without departing from the scope of the invention. Moreover, shapes of lenses and the number of lenses are not necessarily restricted to the shapes and the number of lenses indicated in the examples. In the examples described heretofore, the cover glass may not be disposed necessarily. A lens that is not shown in the diagrams of the examples described above, and that does not have a refractive power practically may be disposed in a lens unit or outside the lens unit.

A lens may be formed of a single material or may be formed of a plurality of materials. Examples of the lens formed of a plurality of glass materials include cemented lenses as well as hybrid lenses and diffractive optical elements as described above. Diffractive optical elements exist, for example, in two forms. In the first form, a diffraction-effect surface is formed on the surface of a lens formed of a single material. In the second form, another material is formed on the surface of a lens formed of a single material and a diffraction-effect surface is formed on the surface of the other material.

The present invention can provide a telephoto lens having excellent portability and in which aberration is corrected favorably, and an image pickup apparatus including the same.

As described above, the present invention is suitable for a telephoto lens having excellent portability and in which aberration is corrected favorably, and for an image pickup apparatus having excellent portability and capable of producing a high-quality image.

What is claimed is:

1. A telephoto lens comprising lens units consisting of, in order from an object side:
   a first lens unit having a positive refractive power;
   a second lens unit having a negative refractive power; and
   a third lens unit,
   wherein:
   the first lens unit consists of, in order from the object side, a front-side lens unit having a positive refractive power and a rear-side lens unit,
   at a time of focusing, the second lens unit moves,
   the third lens unit has a positive lens and a negative lens,
   the first lens unit has one or a plurality of negative lens elements which satisfies following Conditional Expression (a),
   the rear-side lens unit comprises a predetermined negative lens element that is closest to the object side from among lens elements in the rear-side lens unit, and that is closest to the object side from among the one or plurality of negative lens elements of the first lens unit,
   lens elements of the front-side lens unit which are positioned closer to the object side than the predetermined negative lens element include a plurality of positive lens elements,
   the rear-side lens unit has the predetermined negative lens element and a positive lens element, and
   following Conditional Expressions (1A) and (14) are satisfied:

$$0.5 \leq |f/fLn| \leq 4.908 \tag{a}$$

$$0.015 \leq DGFGR/f \leq 0.25 \tag{1A}$$

and $$0.19 \leq DGFairmax/DGF \leq 1.0 \tag{14}$$

where,
f is a focal length of the telephoto lens at a time of focusing on an infinite object;
fLn is a focal length of the predetermined negative lens element;
DGFGR is an axial air space between the front-side lens unit and the rear-side lens unit;
DGFairmax is a largest axial air space, of axial air spaces in the front-side lens unit; and
DGF is an axial thickness of the front-side lens unit.

2. The telephoto lens according to claim 1, wherein the rear-side lens unit has a first rear-side lens unit and a second rear-side lens unit.

3. The telephoto lens according to claim 2, wherein the first rear-side lens unit has a negative refractive power.

4. The telephoto lens according to claim 3, wherein the second rear-side lens unit has a positive refractive power.

5. The telephoto lens according to claim 2, wherein following Conditional Expression (5) is satisfied:

$$0.02 \leq DGR1GR2/f \leq 0.3 \tag{5}$$

where,
DGR1GR2 is an axial air space between the first rear-side lens unit and the second rear-side lens unit; and
f is the focal length of the telephoto lens at the time of focusing on an infinite object.

6. The telephoto lens according to claim 2, wherein following Conditional Expression (8) is satisfied:

$$-3.0 \leq fGF/fGR1 \leq 0.1 \tag{8}$$

where,
fGF is a focal length of the front-side lens unit; and
fGR1 is a focal length of the first rear-side lens unit.

7. The telephoto lens according to claim 2, wherein the first rear-side lens unit has at least two negative lens elements.

8. The telephoto lens according to claim 2, wherein following Conditional Expression (17) is satisfied:

$$1.5 \leq |fG1/fG2| \leq 6.5 \tag{17}$$

where,
fG1 is a focal length of the first lens unit; and
fG2 is a focal length of the second lens unit.

9. The telephoto lens according to claim 2, wherein only the second lens unit moves in an optical axis direction.

10. The telephoto lens according to claim 1, wherein following Conditional Expression (2A) is satisfied:

$$0.10 \leq \Delta GFGR/f \leq 0.5 \tag{2A}$$

where
ΔGFGR is an axial air space from an object-side surface in the front-side lens unit to an object-side surface in the rear-side lens unit; and
f is the focal length of the telephoto lens at the time of focusing on an infinite object.

11. The telephoto lens according to claim 1, wherein following Conditional Expression (3) is satisfied:

$$72 \leq vdGFave \leq 82.445 \tag{3}$$

where,
vdGFave is an average Abbe number of the positive lens elements in the front-side lens unit.

12. The telephoto lens according to claim 11, wherein following Conditional Expression (3-2) is satisfied:

$$77 \leq vdGFave \leq 82.445 \tag{3-2}$$

where,
vdGFave is the average Abbe number of the positive lens elements in the front-side lens unit.

13. The telephoto lens according to claim 1, wherein following Conditional Expression (4) is satisfied:

$$84 \leq vdGFmax \leq 94.66 \tag{4}$$

where,
vdGFmax is a largest Abbe number, of Abbe numbers of the positive lens elements in the front-side lens unit.

14. The telephoto lens according to claim 1, wherein following Conditional Expression (6) is satisfied:

$$0.2 \leq fGF/f \leq 0.8 \tag{6}$$

where,
fGF is a focal length of the front-side lens unit; and
f is the focal length of the telephoto lens at the time of focusing on an infinite object.

15. The telephoto lens according to claim 1, wherein a first lens element is disposed closest to the object side, and
following Conditional Expression (7) is satisfied:

$$1.6 \leq fL1/fGF \leq 5.0 \tag{7}$$

where,
fL1 is a focal length of the first lens element; and
fGF is a focal length of the front-side lens unit.

16. The telephoto lens according to claim 1, wherein following Conditional Expression (9) is satisfied:

$$0.06 \leq |fG2/f| \leq 0.25 \tag{9}$$

where,
fG2 is a focal length of the second lens unit; and
f is the focal length of the telephoto lens at the time of focusing on an infinite object.

17. The telephoto lens according to claim 1, wherein following Conditional Expression (10) is satisfied:

$$3.5 \leq |MGG2B^2 \times (MGG2^2 - 1)| \leq 6.5 \tag{10}$$

where,
MGG2B is a lateral magnification of a first rear-side lens system;
MGG2 is a lateral magnification of the second lens unit;
the lateral magnification is a lateral magnification at the time of focusing on an infinite object; and
the first rear-side lens system is a lens system comprising all of lenses of the third lens unit, which are positioned closer to an image side than the second lens unit.

18. The telephoto lens according to claim 1, wherein the second lens unit includes a total of two or less lens elements.

19. The telephoto lens according to claim 1, wherein the second lens unit consists of a lens element having a positive refractive power and a lens element having a negative refractive power.

20. The telephoto lens according to claim 1, wherein
the second lens unit has a plastic lens element having a positive refractive power and a plastic lens element having a negative refractive power, and
following Conditional Expression (11) is satisfied:

$$-0.6 \leq fPLn/fPLp \leq -0.15 \tag{11}$$

where,
fPLn is a focal length of the plastic lens element having a negative refractive power; and
fPLp is a focal length of the plastic lens element having a positive refractive power.

21. The telephoto lens according to claim 1, wherein
the second lens unit has a plastic lens element having a positive refractive power and a glass lens element having a negative refractive power,
the plastic lens element and the glass lens element are integrally molded, and
following Conditional Expression (12) is satisfied:

$$0.2 \leq |fG2/fPLp| \leq 0.7 \tag{12}$$

where,
fG2 is a focal length of the second lens unit; and
fPLp is a focal length of the plastic lens element having a positive refractive power.

22. The telephoto lens according to claim 1, wherein
the third lens unit has a camera shake-correction lens unit, and
the camera shake-correction lens unit moves in a direction vertical to an optical axis.

23. The telephoto lens according to claim 22, wherein
the third lens unit has a sub-lens unit on the object side, and
the sub-lens unit has a refractive power with a sign different from that of the camera shake-correction lens unit.

24. The telephoto lens according to claim 22, wherein
the third lens unit has a sub-lens unit on an image side, and
the sub-lens unit has a refractive power with a sign different from that of the camera shake-correction lens unit.

25. The telephoto lens according to claim 22, wherein
the third lens unit has an object-side sub-lens unit and an image-side sub-lens unit on the object side and on an image side, respectively, and
the object-side sub-lens unit and the image-side sub-lens unit both have a refractive power with a sign different from that of the camera shake-correction lens unit.

26. The telephoto lens according to claim 22, wherein
the camera shake-correction lens unit at least has a first correction lens element, a second correction lens element, and a third correction lens element,
the first correction lens element and the second correction lens element have a refractive power with a same sign as the camera shake-correction lens unit, and
the third correction lens element has a refractive power with a sign different from that of the camera shake-correction lens unit.

27. The telephoto lens according to claim 22, wherein the camera shake-correction lens unit has a negative refractive power.

28. The telephoto lens according to claim 22, wherein following Conditional Expression (13) is satisfied:

$$1.0 < |MGISB \times (MGIS-1)| < 4.0 \tag{13}$$

where,
MGISB is a lateral magnification of a second rear-side lens system;
MGIS is a lateral magnification of the camera shake-correction lens unit;
the lateral magnification is a lateral magnification at the time of focusing on an infinite object; and
the second rear-side lens system is a lens system comprising all of lenses positioned closer to an image side than the camera shake-correction lens unit.

29. The telephoto lens according to claim 1, wherein the third lens unit has
an object-side sub-lens unit having a positive refractive power,
a camera shake-correction lens unit having a negative refractive power, and
an image-side sub-lens unit having a positive refractive power.

30. The telephoto lens according to claim 1, further comprising an aperture stop which is disposed between the first lens unit and the second lens unit.

31. The telephoto lens according to claim 1, wherein the third lens unit has a plurality of lens elements and an optical filter disposed between the plurality of lens elements.

32. The telephoto lens according to claim 1, wherein following Conditional Expression (15A) is satisfied:

$$0.05 \le DGFGR/fGF \le 0.4 \tag{15A}$$

where,
DGFGR is an axial air space between the front-side lens unit and the rear-side lens unit; and
fGF is a focal length of the front-side lens unit.

33. The telephoto lens according to claim 1, wherein following Conditional Expression (16) is satisfied:

$$50 \le vdLp1 \le 70.23 \tag{16}$$

where,
vdLp1 is an Abbe number of a positive lens element positioned closest to the object side.

34. The telephoto lens according to claim 1, wherein the front-side lens unit consists of two positive lens elements.

35. An image pickup apparatus comprising:
an optical system; and
an image pickup element having an image plane and converting an image formed on the image plane by the optical system to an electrical signal,
wherein the optical system is the telephoto lens according to claim 1.

36. A telephoto lens comprising lens units consisting of, in order from an object side:
a first lens unit having a positive refractive power;
a second lens unit having a negative refractive power; and
a third lens unit,
wherein:
the first lens unit consists of, in order from the object side, a front-side lens unit having a positive refractive power, a first rear-side lens unit, and a second rear-side lens unit,
at a time of focusing, the second lens unit moves,
the third lens unit has a positive lens element and a negative lens element,
the first lens unit has one or a plurality of negative lens elements which satisfies following Conditional Expression (a),
the first rear-side lens unit comprises a predetermined negative lens element that is closest to the object side from among lens elements in the first rear-side lens unit, and that is closest to the object side from among the one or plurality of negative lens elements of the first lens unit,
lens elements of the front-side lens unit which are positioned closer to the object side than the predetermined negative lens element include a plurality of positive lens elements,
the first rear-side lens unit has the predetermined negative lens element and a positive lens element,
the second rear-side lens unit has a positive lens element, and
following Conditional Expressions (2B) and (16) are satisfied:

$$0.5 \le |f/fLn| 4.908 \tag{a}$$

$$0.10 \le \Delta GFGR1/f \le 0.5 \tag{2B}$$

and $$50 \le vdLp1 \le 70.23 \tag{16}$$

where,
f is a focal length of the telephoto lens at a time of focusing on an infinite object;
fLn is a focal length of the predetermined negative lens element;
ΔGFGR1 is an axial air space from an object-side surface in the front-side lens unit to an object-side surface in the first rear-side lens unit; and
vdLp1 is an Abbe number of a positive lens positioned closest to the object side.

37. The telephoto lens according to claim 36, wherein following Conditional Expression (1B) is satisfied:

$$0.015 \le DGFGR1/f \le 0.25 \tag{1B}$$

where
DGFGR1 is an axial air space between the front-side lens unit and the first rear-side lens unit; and f is the focal length of the telephoto lens at the time of focusing on an infinite object.

38. The telephoto lens according to claim 36, wherein following Conditional Expression (14) is satisfied:

$$0.19 \leq DGFairmax/DGF \leq 1.0 \quad (14),$$

where,

DGFairmax is a largest axial air space, of axial air spaces in the front-side lens unit; and DGF is an axial thickness of the front-side lens unit.

39. The telephoto lens according to claim 36, wherein following Conditional Expression (15B) is satisfied:

$$0.05 \leq DGFGR1/fGF \leq 0.4 \quad (15B),$$

where,

DGFGR1 is an axial air space between the front-side lens unit and the first rear-side lens unit; and fGF is a focal length of the front-side lens unit.

40. A telephoto lens comprising lens units consisting of, in order from an object side:

a first lens unit having a positive refractive power;
a second lens unit having a negative refractive power; and
a third lens unit,
wherein:
the first lens unit consists of, in order from the object side, a front-side lens unit having a positive refractive power, a first rear-side lens unit, and a second rear-side lens unit,
at a time of focusing, the second lens unit moves,
the third lens unit has a positive lens element and a negative lens element,
the first lens unit has one or a plurality of negative lens elements which satisfies following Conditional Expression (a),
the first rear-side lens unit comprises a predetermined negative lens element that is closest to the object side from among lens elements in the first rear-side lens unit, and that is closest to the object side from among the one or plurality of negative lens elements of the first lens unit,
a lens element of the front-side lens unit which is positioned closer to the object side than the predetermined negative lens element includes at least one positive lens element,
the first rear-side lens unit has the predetermined negative lens element and a positive lens element,
the second rear-side lens unit has a positive lens element, and
following Conditional Expressions (2B) and (3) are satisfied:

$$0.5 \leq |f/fLn| \leq 4.908 \quad (a),$$

$$0.10 \leq \Delta GFGR1/f \leq 0.5 \quad (2B),$$

and $$72 \leq vdGFave \leq 82.445 \quad (3),$$

where, f is a focal length of the telephoto lens at a time of focusing on an infinite object;

fLn is a focal length of the predetermined negative lens element;

ΔGFGR1 is an axial air space from an object-side surface in the front-side lens unit to an object-side surface in the first rear-side lens unit; and vdGFave is an average Abbe number of the at least one positive lens element in the front-side lens unit.

41. The telephoto lens according to claim 40, wherein the front-side lens unit has a plurality of the positive lens elements.

* * * * *